United States Patent
Mirabella et al.

(10) Patent No.: US 11,782,288 B2
(45) Date of Patent: Oct. 10, 2023

(54) HEAD-MOUNTED DEVICE WITH ADJUSTMENT MECHANISM

(71) Applicant: Apple Inc., Cupertino, CA (US)

(72) Inventors: Anna V. Mirabella, Palo Alto, CA (US); Wey-Jiun Lin, Los Altos Hills, CA (US); Jia Tao, Santa Clara, CA (US); Aidan N. Zimmerman, Sunnyvale, CA (US); Jason C. Sauers, Sunnyvale, CA (US); Anthony S. Montevirgen, Milpitas, CA (US); Andrew Gallaher, Sunnyvale, CA (US); Phil M. Hobson, Menlo Park, CA (US); Yoonhoo Jo, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 383 days.

(21) Appl. No.: 17/021,387

(22) Filed: Sep. 15, 2020

(65) Prior Publication Data

US 2021/0080746 A1 Mar. 18, 2021

Related U.S. Application Data

(60) Provisional application No. 62/900,895, filed on Sep. 16, 2019.

(51) Int. Cl.
*G02B 30/22* (2020.01)
*G06F 1/16* (2006.01)
*G02B 7/00* (2021.01)

(52) U.S. Cl.
CPC ............ *G02B 30/22* (2020.01); *G02B 7/002* (2013.01); *G06F 1/163* (2013.01)

(58) Field of Classification Search
CPC ...... G02B 27/017; G02B 30/22; G02B 7/002; G02B 2027/0181; G02B 27/0172;
(Continued)

(56) References Cited

U.S. PATENT DOCUMENTS

2015/0253574 A1* 9/2015 Thurber ............ G02B 27/0172
359/630
2016/0320612 A1* 11/2016 Zhang .................. G02B 27/017
(Continued)

FOREIGN PATENT DOCUMENTS

| CN | 104849864 A | 8/2015 |
| CN | 105204165 A | 12/2015 |

(Continued)

*Primary Examiner* — Jade R Chwasz
(74) *Attorney, Agent, or Firm* — Young Basile Hanlon & MacFarlane, P.C.

(57) ABSTRACT

A head-mounted device includes a first device portion and a second device portion. A first coupler portion of the first device portion is connectable to a second coupler portion of the second device portion to define a connected position in which the first device portion is connected to the second device portion and a disconnected position in which the first device portion is disconnected from the second device portion. A second adjuster portion of the second device portion causes a first adjuster portion of the first device portion to move a first optical module and a second optical module in response to movement of the first device portion and the second device portion from the disconnected position to the connected position.

25 Claims, 28 Drawing Sheets

(58) Field of Classification Search
CPC ........ G02B 27/0176; G02B 2027/0134; G02B 2027/0136; G02B 2027/0154; G02B 2027/0156; G02B 2027/0158; G02B 2027/0159; G06F 1/163; G06F 1/1656
USPC ........................................................ 359/462
See application file for complete search history.

(56) References Cited

U.S. PATENT DOCUMENTS

| | | | |
|---|---|---|---|
| 2017/0102549 A1 | 4/2017 | Lee et al. | |
| 2017/0168303 A1 | 6/2017 | Petrov | |
| 2018/0084232 A1 | 3/2018 | Belenkii et al. | |
| 2019/0028697 A1* | 1/2019 | Sullivan | H04N 13/344 |
| 2021/0373602 A1* | 12/2021 | Min | G06F 3/0304 |

FOREIGN PATENT DOCUMENTS

| | | |
|---|---|---|
| CN | 204832685 U | 12/2015 |
| CN | 205038406 U | 2/2016 |
| CN | 105745569 A | 7/2016 |
| CN | 205750129 U | 11/2016 |
| CN | 205910419 U | 1/2017 |
| CN | 108646420 A | 10/2018 |
| CN | 209014815 U | 6/2019 |
| WO | 2019113974 A1 | 6/2019 |

\* cited by examiner

HEAD-MOUNTED DEVICE WITH ADJUSTMENT MECHANISM

CROSS-REFERENCE TO RELATED APPLICATIONS

This application claims the benefit of U.S. Provisional Application No. 62/900,895, filed on Sep. 16, 2019, the content of which is hereby incorporated by reference herein in its entirety for all purposes.

FIELD

The present disclosure relates generally to the field of head-mounted devices.

BACKGROUND

Head-mounted devices that display computer-generated reality content include display devices and optics that guide light from the display devices to a user's eyes. Typically, two lenses are included to display slightly different images to each of the user's eyes in accordance with stereoscopic vision techniques. An adjustment mechanism may be included to allow the user to change the distance between the two lenses so that the lenses are approximately aligned with respect to the user's eyes.

SUMMARY

A first aspect of the disclosure is a head-mounted device that has a first device portion and a second device portion. The first device portion includes a primary housing, a first optical module, a second optical module, a first coupler portion that is connected to the primary housing, and a first adjuster portion that is operable to move the first optical module and the second optical module with respect to the primary housing. The second device portion includes a secondary housing, a face cushion that is connected to the secondary housing, a second coupler portion that is connected to the secondary housing, and a second adjuster portion that is operable to move the first optical module and the second optical module with respect to the primary housing. The first coupler portion of the first device portion is connectable to the second coupler portion of the second device portion to define a connected position in which the first device portion is connected to the second device portion and a disconnected position in which the first device portion is disconnected from the second device portion. The second adjuster portion causes the first adjuster portion to move the first optical module and the second optical module in response to movement of the first device portion and the second device portion from the disconnected position to the connected position.

In some implementations of the head-mounted device according to the first aspect of the disclosure, the second adjuster portion includes contact surfaces that engage contact surfaces of the first adjuster portion to cause the first adjuster portion to move the first optical module and the second optical module in response to movement of the first device portion and the second device portion from the disconnected position to the connected position. In some implementations of the head-mounted device according to the first aspect of the disclosure, the contact surfaces of the second adjuster portion are located laterally outward relative to the first optical module and the second optical module. In some implementations of the head-mounted device according to the first aspect of the disclosure, the contact surfaces of the second adjuster portion are located laterally inward relative to the first optical module and the second optical module.

In some implementations of the head-mounted device according to the first aspect of the disclosure, the second adjuster portion includes a wedge that engages the first adjuster portion to cause the first adjuster portion to move the first optical module and the second optical module in response to movement of the first device portion and the second device portion from the disconnected position to the connected position.

In some implementations of the head-mounted device according to the first aspect of the disclosure, the second adjuster portion includes annular contact surfaces that engage the first optical module and the second optical module to cause the first adjuster portion to move the first optical module and the second optical module in response to movement of the first device portion and the second device portion from the disconnected position to the connected position.

In some implementations of the head-mounted device according to the first aspect of the disclosure, the first adjuster portion includes a rail, wherein the first optical module and the second optical module are slidably mounted on the rail.

In some implementations of the head-mounted device according to the first aspect of the disclosure, the first adjuster portion includes springs that define an initial position for the first optical module and the second optical module in the disconnected position.

In some implementations of the head-mounted device according to the first aspect of the disclosure, the first adjuster portion includes cams that cause movement of the first optical module and the second optical module in response to movement of the first device portion and the second device portion from the disconnected position to the connected position.

In some implementations of the head-mounted device according to the first aspect of the disclosure, the second adjuster portion includes stop surfaces that allow the first optical module and the second optical module to move to an adjusted position in response to movement of the first device portion and the second device portion from the disconnected position to the connected position.

In some implementations of the head-mounted device according to the first aspect of the disclosure, the first adjuster portion includes a first group of magnetic connector components, the second adjuster portion includes a second group of magnetic connector components, and magnetic attraction of the first group of magnetic connector components to the second group of magnetic connector components causes the first adjuster portion to move the first optical module and the second optical module in response to movement of the first device portion and the second device portion from the disconnected position to the connected position.

In some implementations of the head-mounted device according to the first aspect of the disclosure, the first optical module and the second optical module are connected to the primary housing by an elastic support structure.

In some implementations of the head-mounted device according to the first aspect of the disclosure, the first adjuster portion includes pneumatic actuators.

In some implementations of the head-mounted device according to the first aspect of the disclosure, the first adjuster portion allows manual adjustment of the first optical module and the second optical module, and the second adjuster portion includes stop surfaces.

In some implementations of the head-mounted device according to the first aspect of the disclosure, the first adjuster portion includes flexible connectors that are operable to move the first optical module and the second optical module, the flexible connectors are tensioned when the head-mounted device is worn by a user, and second adjuster portion includes stop surfaces.

In some implementations of the head-mounted device according to the first aspect of the disclosure, the first adjuster portion includes a gross adjustment stage and a fine adjustment stage.

A second aspect of the disclosure is a head-mounted device that includes a first device portion and a second device portion. The first device portion includes a primary housing, electrical components located in the primary housing, and a first coupler portion that is connected to the primary housing. The second device portion includes a secondary housing, a first optical module that is in the secondary housing, a second optical module that is in the secondary housing, a face cushion that is connected to the secondary housing, a second coupler portion that is connected to the secondary housing, and an adjustment assembly that is operable to move the first optical module and the second optical module with respect to the secondary housing. The first coupler portion of the first device portion is connectable to the second coupler portion of the second device portion to define a connected position in which the first device portion is connected to the second device portion and a disconnected position in which the first device portion is disconnected from the second device portion.

In some implementations of the head-mounted device according to the second aspect of the disclosure, the first optical module and the second optical module each include a display device and an optical system.

In some implementations of the head-mounted device according to the second aspect of the disclosure, the electrical components of the first device portion include a processor, a memory, a storage device, a communications device, sensors, and a power source.

In some implementations of the head-mounted device according to the second aspect of the disclosure, adjustment assembly includes an interpupillary distance adjustment stage, a vertical adjustment stage, and an eye relief adjustment stage.

A third aspect of the disclosure is a head-mounted device that includes a first device portion and a second device portion. The first device portion includes a primary housing, a first optical module, a second optical module, a first coupler portion that is connected to the primary housing, and an adjustment assembly that is operable to move the first optical module and the second optical module with respect to the primary housing. The second device portion includes a secondary housing, a face cushion that is connected to the secondary housing, a second coupler portion that is connected to the secondary housing, and an adjustment indicator. The first coupler portion of the first device portion is connectable to the second coupler portion of the second device portion to define a connected position in which the first device portion is connected to the second device portion and a disconnected position in which the first device portion is disconnected from the second device portion. The adjustment assembly moves the first optical module and the second optical module in response to movement of the first device portion and the second device portion from the disconnected position to the connected position using information obtained from the adjustment indicator of the second device portion.

In some implementations of the head-mounted device according to the second aspect of the disclosure, the information obtained from the adjustment indicator includes information describing an interpupillary distance setting.

In some implementations of the head-mounted device according to the second aspect of the disclosure, the adjustment indicator includes an information storage device and transmits the information to the adjustment assembly using wireless communication.

In some implementations of the head-mounted device according to the second aspect of the disclosure, the adjustment indicator includes indicia that are readable by the adjustment assembly. In some implementations of the head-mounted device according to the second aspect of the disclosure, the adjustment assembly is configured to read the indicia by obtaining images of the indicia.

DETAILED DESCRIPTION

The disclosure herein relates to head-mounted devices that are used to show computer-generated reality (CGR) content to users. The head-mounted devices that are described herein include adjustable components that allow features of the device to be adjusted to specific users. The adjustable components may include an interpupillary distance (IPD) adjustment mechanism that is operable to change the distance between the optical axes along which content is displayed to the left and right eyes of the user, such as by shifting the locations of optical modules that correspond to the user's left and right eyes or by shifting the locations of lenses that are included in the optical modules that correspond to the user's left and right eyes. The adjustable components may include an eye relief adjustment mechanism that is operable to change the distance between the optical modules and the user's eyes. Other adjustable components may be included.

In the implementations that are described herein, a head-mounted device includes a first device portion and a second device portion. The first device portion is shared by multiple users, and may include optical modules, sensors, processors, and/or other components. The second device portion is user-specific. In some implementations, the second device portion is connected to the first device portion, adjustable components of the first device portion are adjusted in dependence on settings that are controlled by features of the second device portion. The features of the second device portion may be, as examples, physical features, magnetic features, visible indicators, invisible indicators, information encoded in any format, and/or other features that are carried by the second device portion in a manner that can control adjustment of the adjustable components of the first device portion.

Figure 1:
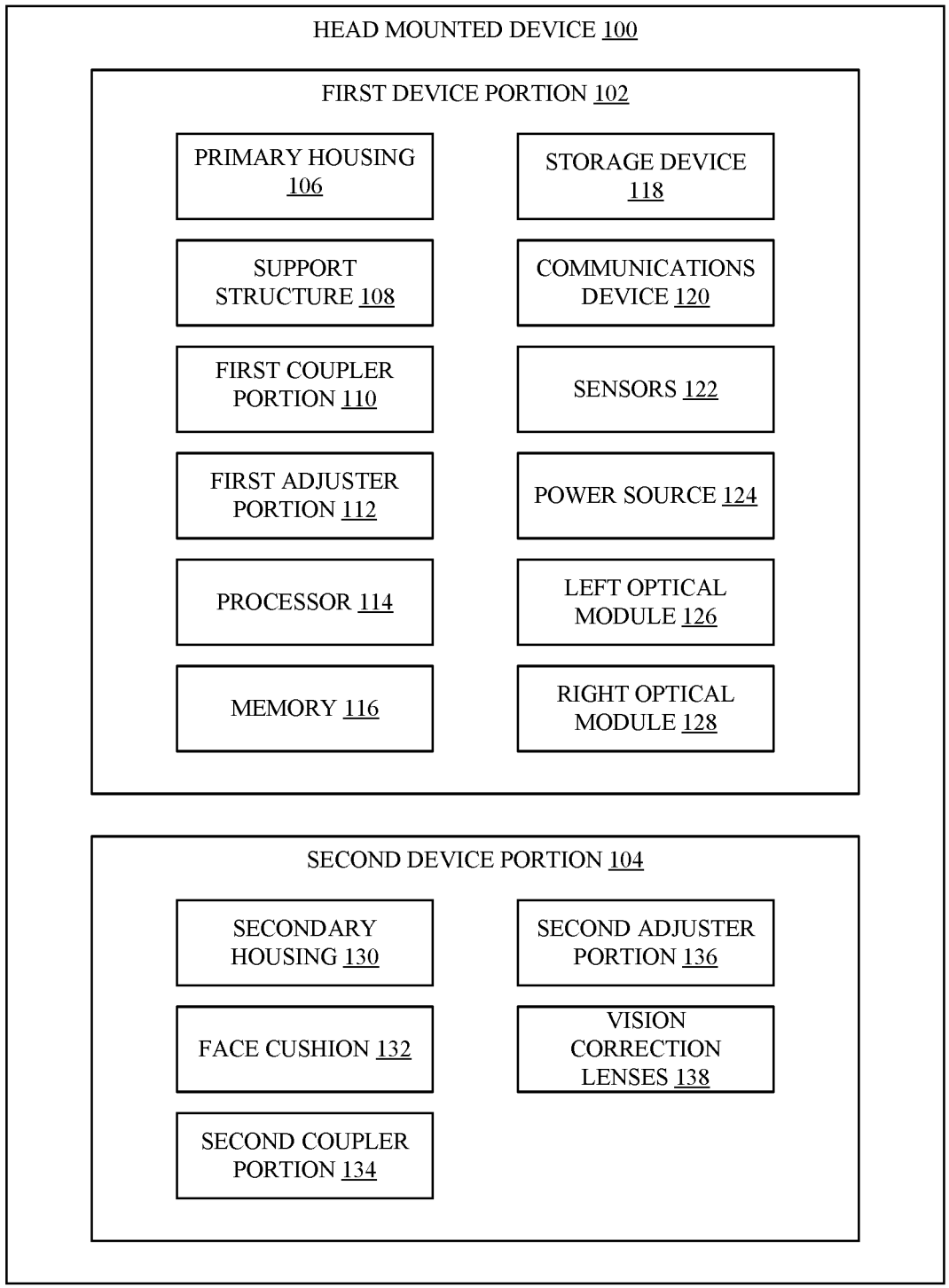
FIG. 1 is a block diagram that shows an example of a hardware configuration for a head-mounted device that includes a first device portion and a second device portion.

FIG. 1 is a block diagram that shows an example of a hardware configuration for a head-mounted device 100. The head-mounted device 100 is intended to be worn on the head of a user and includes components that are configured to display content to the user. Components that are included in the head-mounted device 100 may be configured to track motion of parts of the user's body, such as the user's head and hands. Motion tracking information that is obtained by components of the head-mounted device can be utilized as inputs that control aspects of the generation and display of the content to the user, so that the content displayed to the user can be part of a CGR experience in which the user is able to view and interact with virtual environments and virtual objects. As will be explained further herein, CGR experiences include display of computer-generated content independent of the surrounding physical environment (e.g., virtual reality), and display of computer generated content that is overlaid relative to the surrounding physical environment (e.g., augmented reality).

In the illustrated example, the head-mounted device 100 includes a first device portion 102 and a second device portion 104. The first device portion 102 is intended to be shared by multiple users. The second device portion 104 is not intended to be shared by multiple users, and instead, the second device portion 104 is intended to be user-specific. The first device portion 102 and the second device portion 104 include features that allow them to be securely connected to one another during use of the head-mounted device 100 by a specific user, and then disconnected from one another in preparation for use of the head-mounted device 100 by a different user. The second device portion 104 also includes features that cause adjustment of one or more adjustable components that are included in the first device portion 102.

The first device portion 102 of the head-mounted device 100 may include a primary housing 106, a support structure 108, a first coupler portion 110, a first adjuster portion 112, a processor 114, a memory 116, a storage device 118, a communications device 120, sensors 122, a power source 124, a left optical module 126, and a right optical module 128. These components may be permanently connected portions of the first device portion 102 that are not intended to be disconnected from one another during the course of normal use of the head-mounted device 100.

The primary housing 106 is a structure that supports various other components that are included in the first device portion 102 of the head-mounted device 100. The primary housing 106 may have a size and shape that corresponds generally to the width of an average person's head. The primary housing 106 may have a height that corresponds generally to the distance between an average person's forehead and cheek bones such that it extends above and below the average person's orbital cavities. In one implementation, the primary housing 106 may be an enclosure that some or all of the components of the first device portion 102 are contained in.

The support structure 108 of the first device portion 102 is connected to the primary housing 106 of the first device portion 102. The support structure 108 is a component or collection of components that function to secure the head-mounted device 100 in place with respect to the user's head so that the head-mounted device 100 is restrained from moving with respect to the user's head and maintains a comfortable position during use. The support structure 108 can be implemented using rigid structures, elastic flexible straps, or inelastic flexible straps. As one example, the support structure 108 may be a strap or may include multiple straps that are connected to the primary housing 106 of the first device portion 102 and which define a goggles-type support configuration that supports the head-mounted device 100 with respect to the head of the user. As another example, the support structure 108 may include a rigid structure that is connected to the primary housing 106 of the first device portion 102 to define a halo-type support configuration that supports the head-mounted device 100 with respect to the head of the user.

The first coupler portion 110 is a component or assembly that is included in the first device portion 102 of the head-mounted device 100. The first coupler portion 110 allows connection of the first device portion 102 to the second device portion 104 of the head-mounted device 100.

The first adjuster portion 112 is a component or assembly that is included in the first device portion 102 of the head-mounted device 100. The first adjuster portion 112 allows adjustment of one or more components that are included in the first device portion 102 of the head-mounted device 100 in response to connection of the second device portion 104 to the first device portion 102, as will be explained herein. The first adjuster portion 112 may include, for example, components that support the left optical module 126 and the right optical module 128 such that they are able to move. Examples of such components include rails, springs, linkages, elastic structures, magnets, and pneumatic elements.

The processor 114 is a device that is operable to execute computer program instructions and is operable to perform operations that are described by the computer program instructions. The processor 114 may be implemented using one or more conventional devices and/or more or more special-purpose devices. As examples, the processor 114 may be implemented using one or more central processing units, one or more graphics processing units, one or more application specific integrated circuits, and/or one or more field programmable gate arrays. The processor 114 may be provided with computer-executable instructions that cause the processor 114 to perform specific functions. The memory 116 may be one or more volatile, high-speed, short-term information storage devices such as random-access memory modules.

The storage device 118 is intended to allow for long term storage of computer program instructions and other data. Examples of suitable devices for use as the storage device 118 include non-volatile information storage devices of various types, such as a flash memory module, a hard drive, or a solid-state drive.

The communications device 120 supports wired or wireless communications with other devices. Any suitable wired or wireless communications protocol may be used.

The sensors 122 are components that are incorporated in first device portion 102 of the head-mounted device 100 to generate sensor output signals to are used as inputs by the processor 114 for use in generating CGR content, as will be described herein. The sensors 122 include components that facilitate motion tracking (e.g., head tracking and optionally handheld controller tracking in six degrees of freedom). The sensors 122 may also include additional sensors that are used by the device to generate and/or enhance the user's experience in any way. The sensors 122 may include conventional components such as cameras, infrared cameras, infrared emitters, depth cameras, structured-light sensing devices, accelerometers, gyroscopes, and magnetometers. The sensors 122 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 122. The information that is generated by the sensors 122 is provided to other components of the head-mounted device 100, such as the processor 114, as inputs.

The sensors 122 may also include sensing components that are operable to determine the position of the left optical module 126 and the right optical module 128. This allows content to be generated for the left optical module 126 and the right optical module 128 in dependence on their current positions after they are adjusted. As an example, the sensors 122 may include position encoders of any type that are configured to measure any or all of IPD, eye relief, and vertical position for the left optical module 126 and the right optical module 128. Although shown as being incorporated in the first device portion 102, the sensing components that are operable to determine the position of the left optical module 126 and the right optical module 128 could instead be included in the second device portion 104.

The power source 124 is located in the primary housing 106 of the first device portion 102 of the head-mounted device 100 and supplies electrical power to components of the head-mounted device 100. In some implementations, the power source 124 is a wired connection to electrical power. In some implementations, the power source 124 may include a battery of any suitable type, such as a rechargeable battery. In implementations that include a battery, the head-mounted device 100 may include components that facilitate wired or wireless recharging.

The left optical module 126 and the right optical module 128 are assemblies that function to show images to the user. The left optical module 126 and the right optical module 128 are included in the first device portion 102 and are connected to and supported by the primary housing 106 of the first device portion 102. The left optical module 126 displays a first image that is intended to be seen by the user's left eye and which may be referred to herein as a left-eye image. The right optical module 128 displays a first image that is intended to be seen by the user's right eye and which may be referred to herein as a right-eye image. By allowing display of the left-eye image and the right-eye image as separate images, the left optical module 126 and the right optical module 128 facilitate display of stereoscopic images to the user, such that the user may perceive the displayed images as a three-dimensional representation of a CGR environment.

The second device portion 104 may include a secondary housing 130, a face cushion 132, a second coupler portion 134, a second adjuster portion 136, and vision correction lenses 138.

The secondary housing 130 is a structure that supports various other components that are included in the second device portion 104 of the head-mounted device 100. The secondary housing 130 may have a size and shape that corresponds generally to the width of an average person's head. The secondary housing 130 may have a height that corresponds generally to the distance between an average person's forehead and cheek bones such that it extends above and below the average person's orbital cavities. In one implementation, the secondary housing 130 may be a frame or enclosure that some or all of the components of the second device portion 104 are connected to or contained in.

The face cushion 132 is connected to the secondary housing 130 and is located at areas around a periphery of the secondary housing 130 where contact with the user's face is likely. The face cushion 132 functions to conform to portions of the user's face to allow the support structure 108 of the first device portion 102 to be tensioned to an extent that will restrain motion of the head-mounted device 100 with respect to the user's head. The face cushion 132 may also function to reduce the amount of light from the physical environment around the user that reaches the user's eyes. The face cushion 132 may contact areas of the user's face, such as the user's forehead, temples, and cheeks. The face cushion 132 may be formed from a compressible material, such as open-cell foam or closed cell foam, so that the head-mounted device 100 may be held securely with respect to the user's head without discomfort.

The second coupler portion 134 is a component or assembly that is included in the second device portion 104 of the head-mounted device 100. The second coupler portion 134 allows connection of the first device portion 102 to the second device portion 104 of the head-mounted device 100. The second coupler portion 134 is connectable to the first coupler portion 110 of the first device portion 102 to connect the first device portion 102 to the second device portion 104.

The first coupler portion 110 and the second coupler portion 134 allow the first device portion 102 and the second device portion 104 to be moved between a disconnected position and a connected position. In the disconnected position, the first coupler portion 110 and the second coupler portion 134 are not engaged with each other and the first device portion 102 is not connected to (i.e., disconnected from) the second device portion 104. In the connected position, the first coupler portion 110 and the second coupler portion 134 are engaged with each other and the first device portion 102 is connected to the second device portion 104.

As one example, the first coupler portion 110 and the second coupler portion 134 may be physical connection structures such as surfaces that define a friction fit or complementary mechanical elements, such as hooks, catches, latches, snaps, etc. As another example, the first coupler portion 110 and the second coupler portion 134 may include magnetic connection structures (e.g., a group of magnets connectable to a group of ferromagnetic elements). The first coupler portion 110 or the second coupler portion 134 may, in some implementations, include a release mechanism, such as a button that causes disengagement of the first coupler portion 110 and the second coupler portion 134 when depressed.

In some implementations, the first coupler portion 110 and the second coupler portion 134 may be configured to separate in response to application of force above a threshold to the head-mounted device (e.g., by separation of a friction fit or magnetic connection). Application of force above a threshold may occur, for example, if the head-mounted device 100 is dropped. By separation of the first coupler portion 110 and the second coupler portion 134, the second device portion 104 is released from the first device portion 102. As will be explained further herein, position adjustment for the left optical module 126 and the right optical module 128 is set by connection of the second device portion 104 to the first device portion 102. When the second device portion 104 is released the first device portion 102, the left optical module 126 and the right optical module 128 may move relative to the primary housing 106 of the first device portion 102 as opposed to being fixed in place. Motion of the left optical module 126 and the right optical module 128 cushions them against damage (e.g., during a fall) by allowing the adjustment components (e.g., springs) to absorb energy.

The second adjuster portion 136 is a component or assembly that is included in the second device portion 104 of the head-mounted device 100. The second adjuster portion 136 is operable to cause adjustment of one or more components that are included in the first device portion 102 of the head-mounted device 100 in response to connection of the second device portion 104 to the first device portion 102, as will be explained herein. As an example, the first adjuster portion 112 of the first device portion 102 may include a moveable component, and connection of the second device portion 104 to the first device portion 102 may engage the second adjuster portion 136 of the second device portion 104 with the first adjuster portion 112 of the first device portion 102 to cause movement of the first adjuster portion 112. In another example, the optical module locations may be readily adjusted by virtue of malleability of certain features of the second device portion 104, and the structure is fixed in place once adjustments are complete. As examples, low temperature plastics or magnetorheological fluid can be used. Additional examples of the structure and operation of the first adjuster portion 112 and the second adjuster portion 136 will be described in detail herein.

The vision correction lenses 138 are user-specific lenses intended to correct the user's vision (e.g., prescription lenses). The vision correction lenses 138 may be permanently connected to the secondary housing 130 of the second device portion 104 or may be removably connected (connectable and disconnectable) to the secondary housing 130 of the second device portion 104.

In some implementations, the vision correction lenses 138 may define a field of view that is user-specific. The field of view may be a predetermined user-selected field of view if the vision correction lenses 138 are permanently connected to the secondary housing 130. The field of view may be changeable by replacing lenses if the vision correction lenses 138 are removably connected to the secondary housing 130.

In some implementations, the vision correction lenses 138 may define a binocular overlap that is user-specific. The binocular overlap may be a predetermined user-selected binocular overlap if the vision correction lenses 138 are permanently connected to the secondary housing 130. The binocular overlap may be changeable by replacing lenses if the vision correction lenses 138 are removably connected to the secondary housing 130.

In the description above, the support structure 108 is part of the first device portion 102 and is connected to the primary housing 106. It should be understood that the support structure 108 can instead be part of the second device portion 104 and be connected to the secondary housing 130 of the second device portion 104. For example, the support structure 108 may have a goggles-type strap configuration that is connected to the secondary housing 130 of the second device portion 104 or the support structure may have a halo-type configuration having one or more rigid structures that are connected to the secondary housing 130 of the second device portion 104.

The two-part architecture of the head-mounted device 100 allows for customization of other aspects of the second device portion 104 in addition to setting optical module positions upon connection of the second device portion 104 to the first device portion 102. As one example, the face cushion 132 may be customized for the user. In one implementation, the face cushion 132 may be head-molded to the contours of the user's face. In another implementation, loss of calibration between the lens and display of either of the left optical module 126 and the right optical module 128 may be corrected by changes to the second device portion 104, which may be performed using a calibration fixture.

Figure 2:
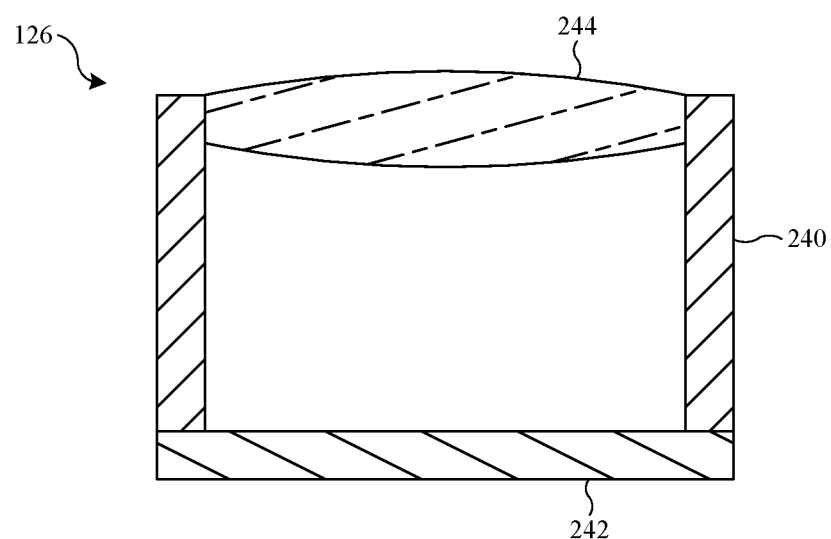
FIG. 2 is an illustration that shows an example implementation of a left optical module of the first device portion of the head-mounted device.

FIG. 2 is an illustration that shows an example implementation of the left optical module 126 of the first device portion 102 of the head-mounted device 100. The configuration shown and described for the left optical module 126 can also be used to implement the right optical module 128. In the illustrated example, the left optical module 126 includes an optical module housing 240, a display device 242, and an optical system 244.

The display device 242 is connected to the optical module housing 240 and functions to display content to the user. The display device 242 is a light-emitting display device, such as a video display of any suitable type, that is able to output images in response to a signal that is received from the processor 114. The display device 242 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 242 may include multiple individual display devices (e.g., two display screens or other display devices arranged side-by-side in correspondence to the user's left eye and the user's right eye).

The optical system 244 is connected to the optical module housing 240 is associated with the display device 242 such that light emitted by the display device 242 is incident upon components (e.g., lenses) of the optical system 244. Thus, the optical system 244 is optically coupled to the display device 242 such that is directs light from the display device toward the user's eye. The optical system 244 is connected to the optical module housing 240 such that portions of the optical system 244 (e.g., lenses) are positioned adjacent to the user's eye. The optical system 244 directs the emitted light from the display device 242 to the user's eyes. In the illustrated example, the optical system 244 is configured isolate the emitted light from environmental light (e.g., as in a virtual reality type system). In alternative implementations, the optical system 244 may be configured to combine the emitted light with environmental light such that a spatial correspondence is established between the emitted light and the environmental light (e.g., as in an augmented reality type system). The optical system 244 may include one or more lenses, reflectors, polarizers, filters, optical combiners, and/or other optical components.

Figure 3:
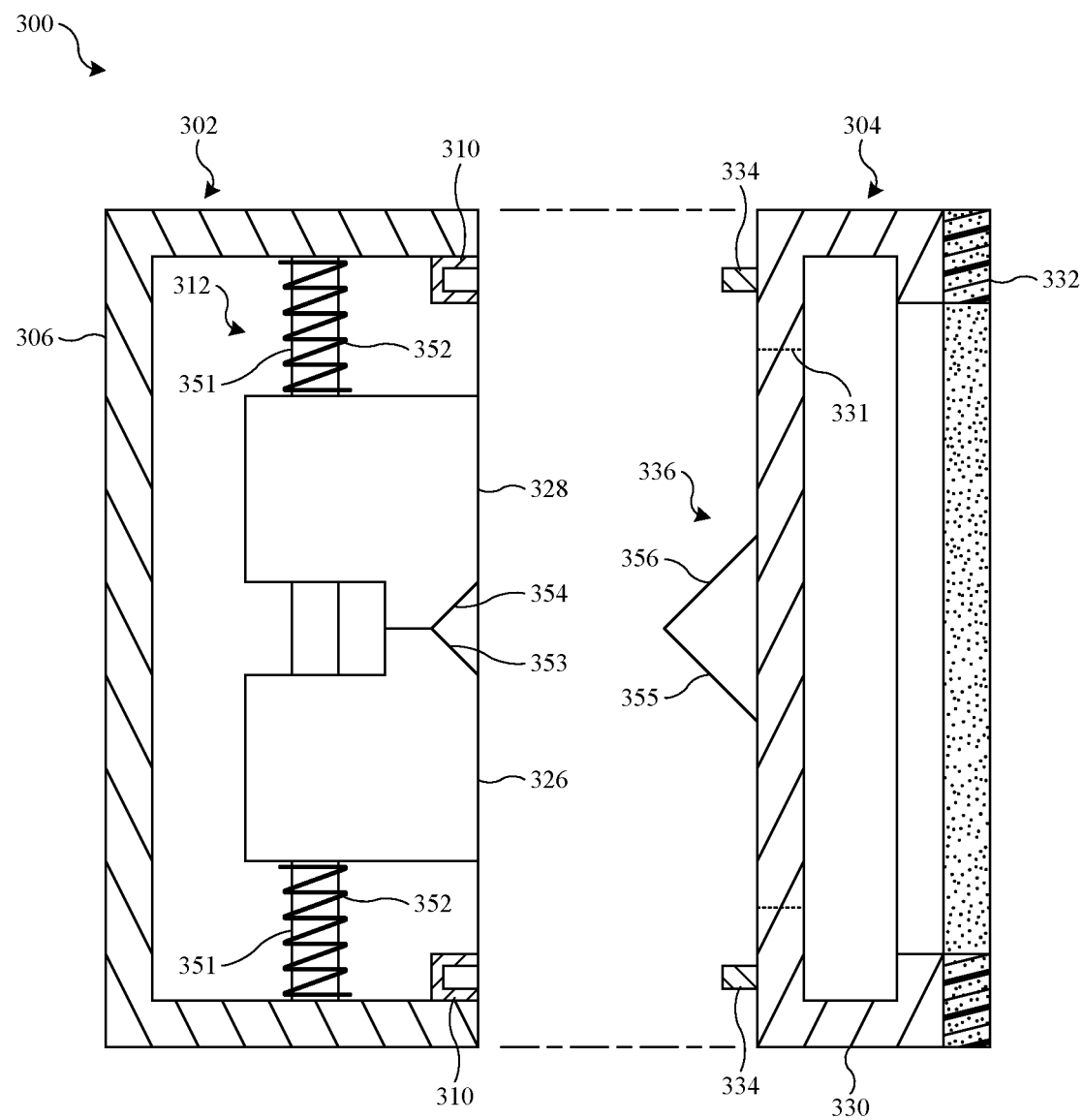
FIG. 3 is a top-down cross-section illustration that shows a first example of a head-mounted device with a first device portion and a second device portion of the head-mounted device shown in a disconnected position.
Figure 4:
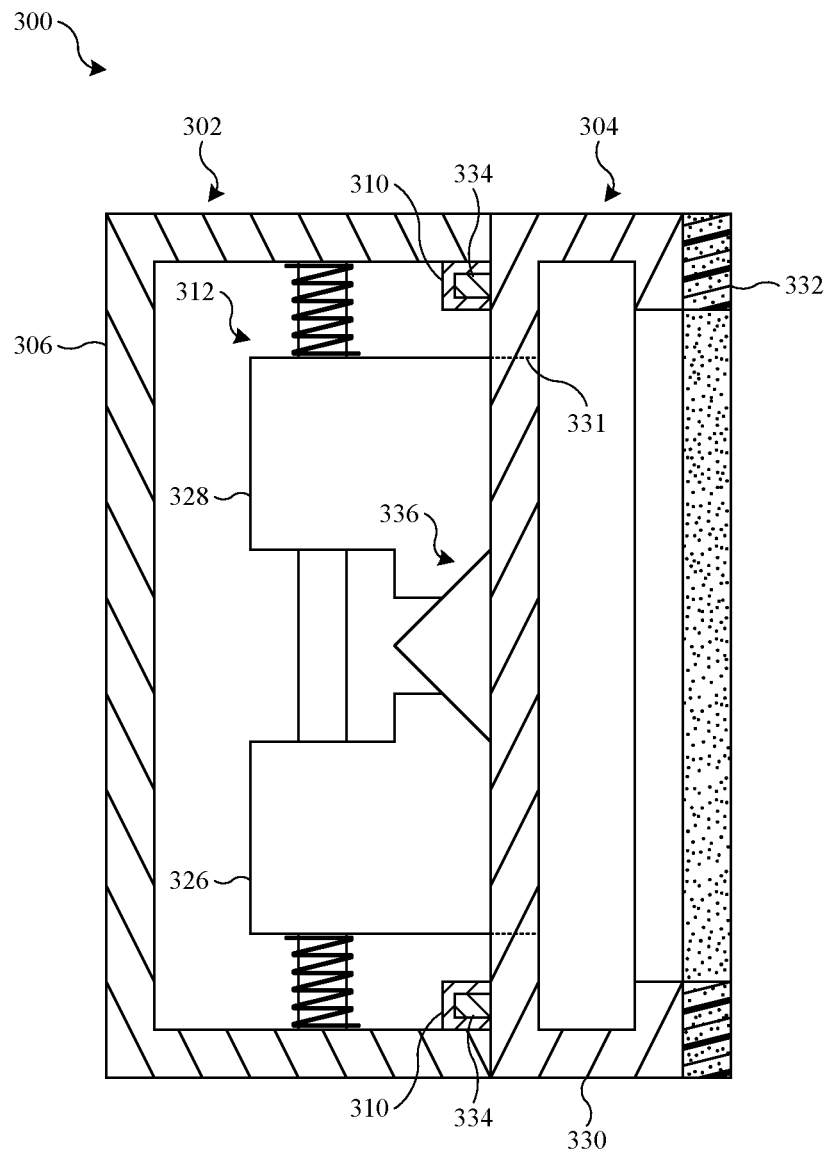
FIG. 4 is a top-down cross-section illustration that shows the first example of the head-mounted device with the first device portion and the second device portion of the head-mounted device shown in a connected position.

FIG. 3 is a top-down cross-section illustration that shows a first example of a head-mounted device 300 with a first device portion 302 and a second device portion of the head-mounted device 300 shown in a disconnected position. FIG. 4 is a top-down cross-section illustration that shows the first example of the head-mounted device 300 with the first device portion 302 and the second device portion 304 of the head-mounted device 300 shown in a connected position.

The head-mounted device 300 may be implemented in the manner described with respect to the head-mounted device 100 except as stated otherwise herein, and the description of the head-mounted device 100 and its components from FIGS. 1-2 is hereby incorporated by reference in the description of the head-mounted device 300.

The first device portion 302 of the head-mounted device 300 includes a primary housing 306, a first coupler portion 310, a first adjuster portion 312, a left optical module 326, and a right optical module 328. The second device portion 304 of the head-mounted device 300 includes a secondary housing 330, a face cushion 332, a second coupler portion 334, and a second adjuster portion 336. An opening 331 is formed in the secondary housing 330 to allow visibility of the left optical module 326 and the right optical module 328 when the head-mounted device 300 is worn by a user. Other components may be included in the first device portion 302 and the second device portion 304 of the head-mounted device 300, including components that were described with respect to the head-mounted device 100.

The first adjuster portion 312 and the second adjuster portion 336 cooperate to define an IPD adjustment assembly. The IPD adjustment assembly allows a distance between an optical axis of the left optical module 326 and an optical axis of the right optical module 328 to be adjusted between a minimum IPD and a maximum IPD.

In the illustrated example, the first adjuster portion 312 is an assembly that includes a rail 351 and springs 352. The rail 351 may be located in the primary housing 306 and fixed with respect to the primary housing 306. The left optical module 326 and the right optical module 328 are connected to the rail 351 and supported with respect to the rail 351 to allow lateral (side-to-side) sliding of the left optical module 326 and the right optical module 328 with respect to the rail 351 and with respect to the primary housing 306. The rail 351 may be any structural element that allows the left optical module 326 and the right optical module 328 to be mounted to it in a manner that allows sliding. The rail 351 may be a single structure or may include multiple structures. Sliding motion of the left optical module 326 and the right optical module 328 with respect to the rail includes sliding of the left optical module 326 and the right optical module 328 toward one another to decrease the IPD and sliding of the left optical module 326 and the right optical module 328 away from one another to increase the IPD.

The springs 352 define an initial position for the left optical module 326 and the right optical module 328 in the disconnected position. The springs 352 resist movement of the left optical module 326 and the right optical module 328 in a laterally outward direction with respect to the rail 351 and urge the left optical module 326 and the right optical module 328 toward each other in a laterally inward direction. In the illustrated implementation, the springs 352 are compression springs that are located laterally outward from the left optical module 326 and the right optical module 328. In an alternative implementation, the springs 352 may be replaced by one or more springs that have a different configuration and are likewise configured to resist movement of the left optical module 326 and the right optical module 328 in a laterally outward direction with respect to the rail 351 and urge the left optical module 326 and the right optical module 328 toward each other in a laterally inward direction. For example, the springs 352 could be replaced by one or more tension springs that are located between the left optical module 326 and the right optical module 328 and which are configured to urge the left optical module 326 and the right optical module 328 laterally inward.

The first adjuster portion 312 also includes a first contact surface 353 and a second contact surface 354. The first contact surface 353 is formed on or connected to the left optical module 326 at laterally inward location relative to the left optical module 326. The second contact surface 354 is formed on or connected to the right optical module 328 at laterally inward location relative to the right optical module 328. Thus, the first contact surface 353 and the second contact surface 354 are located laterally between the left optical module 326 and the right optical module 328. In the illustrated example, the first contact surface 353 and the second contact surface 354 are inclined such that force applied in a longitudinal (front-to-back) direction causes the left optical module 326 and the right optical module 328 to move laterally outward with respect to each other.

The second adjuster portion 336 also includes a wedge structure that is defined by a first contact surface 355 and a second contact surface 356. The first contact surface 355 and the second contact surface 356 are formed on or connected to the secondary housing 330 of the second device portion 304. As an example, the first contact surface 355 and the second contact surface 356 may define a wedge that serves as a structural rib that also supports the face cushion 332.

In the illustrated example, the first contact surface 355 and the second contact surface 356 of the second device portion 304 are inclined in a wedge shaped configuration such that they are configured to engage the first contact surface 353 and the second contact surface 354 of the first device portion 302 during connection of the second device portion 304 to the first device portion 302 to move the left optical module 326 and the right optical module 328 laterally away from each other. Thus, in the disconnected position, the left optical module 326 and the right optical module 328 are positioned laterally inward relative to the primary housing 306 (e.g., toward a lateral center of the primary housing 306), and in the connected position that the left optical module 326 and the right optical module 328 have been moved laterally away from each other as a result of engagement of the first contact surface 355 and the second contact surface 356 of the second adjuster portion 336 with the first contact surface 353 and the second contact surface 354 of the first adjuster portion 312.

The second device portion 304 is connectable to and disconnectable from the first device portion 302 by engagement and disengagement of the first coupler portion 310 of the first device portion 302 with the second coupler portion 334 of the second device portion 304. Connection and disconnection of the first coupler portion 310 and the second coupler portion 334 allows movement of the first device portion 302 and the second device portion 304 between the disconnected position (FIG. 3) and the connected position (FIG. 4). As previously described, the first coupler portion 310 and the second coupler portion 334 may be physical connection structures, magnetic connection structures, or other types of connection structures.

The second adjuster portion 336 of the second device portion 304 is configured to cause the left optical module 326 and the right optical module 328 of the first device portion to move to a specific lateral spacing with respect to each other in the connected position, which corresponds to a specific IPD that is therefore set by connection of the second device portion 304 to the first device portion 302. Several similarly configured second device portions may be made for use with the first device portion 302, and each of the several similarly configured device portions may have a differently configured second adjuster portion (by a fixed configuration or adjustable configuration) that corresponds to a specific IPD. This allows each of several users to use the first device portion 302 with their own user-specific instance of the second device portion 304.

Figure 5:
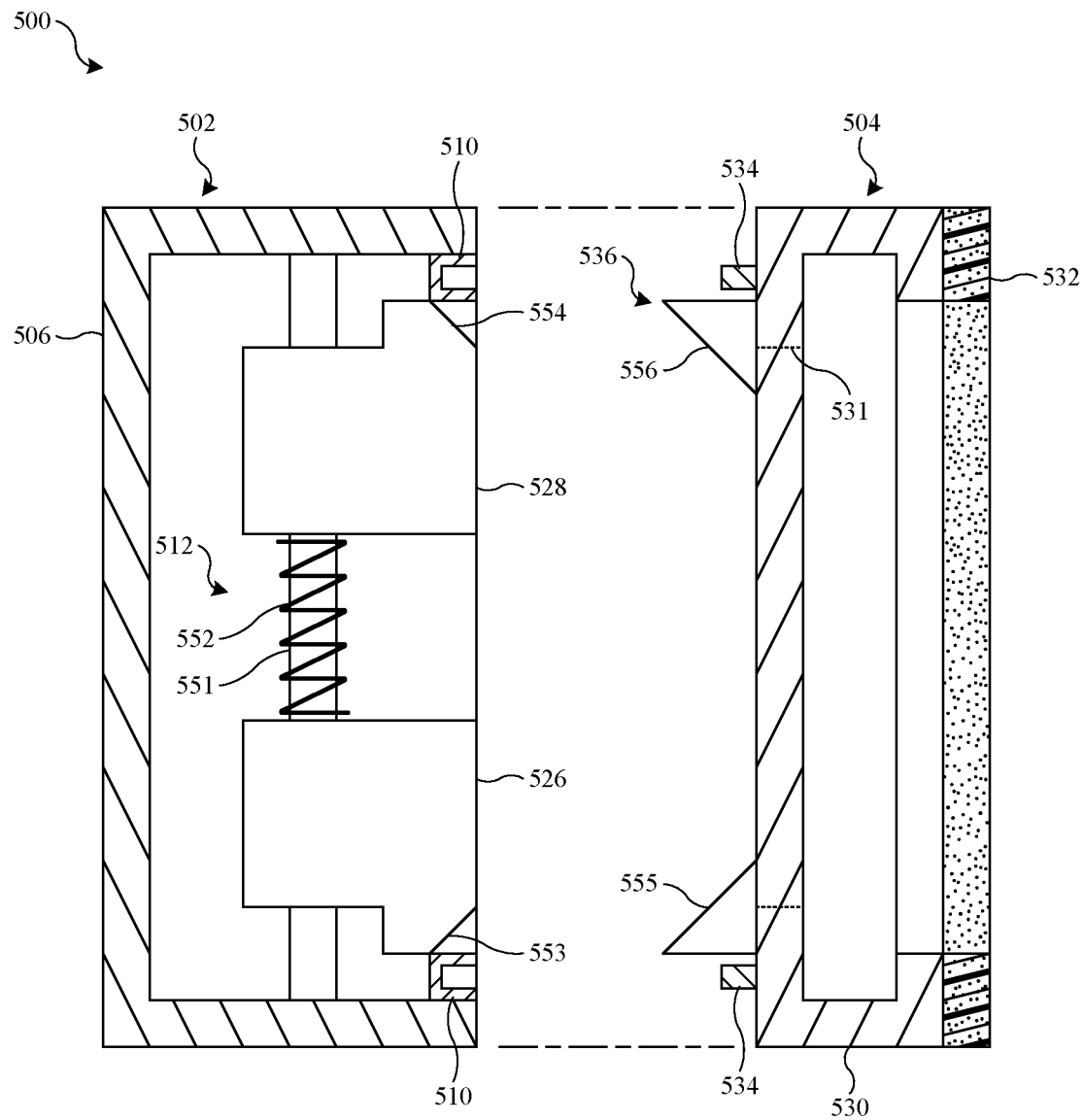
FIG. 5 is a top-down cross-section illustration that shows a second example of a head-mounted device with a first device portion and a second device portion of the head-mounted device shown in a disconnected position.
Figure 6:
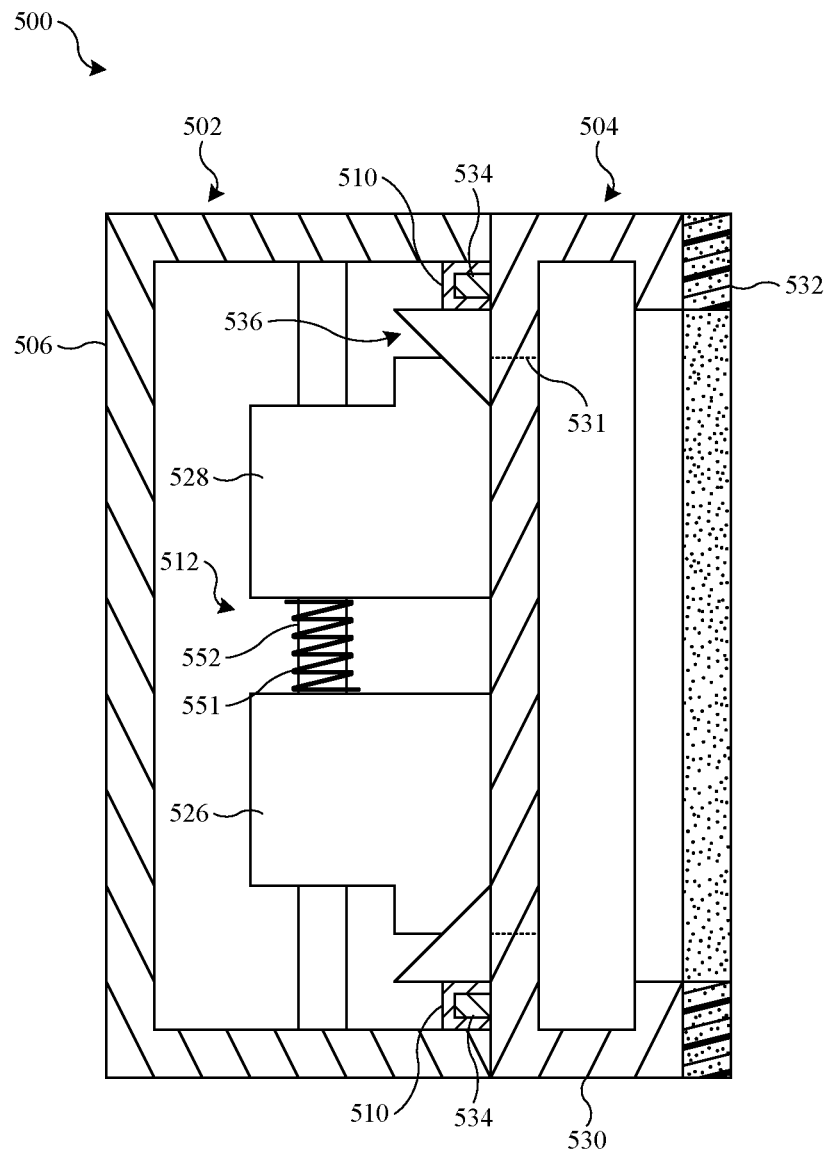
FIG. 6 is a top-down cross-section illustration that shows the second example of the head-mounted device with the first device portion and the second device portion of the head-mounted device shown in a connected position.

FIG. 5 is an illustration that shows a second example of a head-mounted device 500 with a first device portion 502 and a second device portion of the head-mounted device 500 shown in a disconnected position. FIG. 6 is an illustration that shows the second example of the head-mounted device 500 with the first device portion 502 and the second device portion 504 of the head-mounted device 500 shown in a connected position.

The head-mounted device 500 may be implemented in the manner described with respect to the head-mounted device 100 except as stated otherwise herein, and the description of the head-mounted device 100 and its components from FIGS. 1-2 is hereby incorporated by reference in the description of the head-mounted device 500.

The first device portion 502 of the head-mounted device 500 includes a primary housing 506, a first coupler portion 510, a first adjuster portion 512, a left optical module 526, and a right optical module 528. The second device portion 504 of the head-mounted device 500 includes a secondary housing 530, a face cushion 532, a second coupler portion 534, and a second adjuster portion 536. An opening 531 is formed in the secondary housing 530 to allow visibility of the left optical module 526 and the right optical module 528 when the head-mounted device 500 is worn by a user. Other components may be included in the first device portion 502 and the second device portion 504 of the head-mounted device 500, including components that were described with respect to the head-mounted device 100.

The first adjuster portion 512 and the second adjuster portion 536 cooperate to define an IPD adjustment assembly. The IPD adjustment assembly allows a distance between an optical axis of the left optical module 526 and an optical axis of the right optical module 528 to be adjusted between a minimum IPD and a maximum IPD.

In the illustrated example, the first adjuster portion 512 is an assembly that includes a rail 551 and a spring 552. The rail 551 may be located in the primary housing 506 and fixed with respect to the primary housing 506. The left optical module 526 and the right optical module 528 are connected to the rail 551 and supported with respect to the rail 551 to allow lateral (side-to-side) sliding of the left optical module 526 and the right optical module 528 with respect to the rail 551 and with respect to the primary housing 506. The rail 551 may be any structural element that allows the left optical module 526 and the right optical module 528 to be mounted to it in a manner that allows sliding. The rail 551 may be a single structure or may include multiple structures. Sliding motion of the left optical module 526 and the right optical module 528 with respect to the rail includes sliding of the left optical module 526 and the right optical module 528 toward one another to decrease the IPD and sliding of the left optical module 526 and the right optical module 528 away from one another to increase the IPD.

The spring 552 define an initial position for the left optical module 526 and the right optical module 528 in the disconnected position. The spring 552 resists movement of the left optical module 526 and the right optical module 528 in a laterally inward direction with respect to the rail 551 and urges the left optical module 526 and the right optical module 528 away from each other in a laterally outward direction. In the illustrated implementation, the spring 552 is a compression spring that is located laterally inward relative to and between the left optical module 526 and the right optical module 528. In an alternative implementation, the spring 552 may be replaced by one or more springs that have a different configuration and are likewise configured to resist movement of the left optical module 526 and the right optical module 528 in a laterally inward direction with respect to the rail 551 and urge the left optical module 526 and the right optical module 528 away from each other in a laterally outward direction. For example, the spring 552 could be replaced by tension springs that are each located laterally outward from one of the left optical module 526 or the right optical module 528 and which are configured to urge the left optical module 526 and the right optical module 528 laterally outward toward side walls of the primary housing 506.

The first adjuster portion 512 also includes a first contact surface 553 and a second contact surface 554. The first contact surface 553 is formed on or connected to the left optical module 526 at laterally outward location relative to the left optical module 526. The second contact surface 554 is formed on or connected to the right optical module 528 at a laterally outward location relative to the right optical module. In the illustrated example, the first contact surface 553 and the second contact surface 554 are inclined such that force applied in a longitudinal (front-to-back) direction causes the left optical module 526 and the right optical module 528 to move laterally inward with respect to each other.

The second adjuster portion 536 also includes two wedge structures that are defined by a first contact surface 555 and a second contact surface 556. The first contact surface 555 is formed on or connected to the secondary housing 530 near a left lateral side of the secondary housing 530. The second contact surface 556 is formed on or connected to the secondary housing 530 near a right lateral side of the secondary housing 530. In the illustrated example, the first contact surface 555 and the second contact surface 556 of the second device portion 504 are inclined inward toward each other such that they are configured to engage the first contact surface 553 and the second contact surface 554 of the first device portion 502 during connection of the second device portion 504 to the first device portion 502 to move the left optical module 526 and the right optical module 528 laterally toward from each other. Thus, in the disconnected position, the left optical module 526 and the right optical module 528 are positioned laterally outward relative to the primary housing 506 (e.g., away from a lateral center of the primary housing 506 and near the lateral side walls of the primary housing 506), and in the connected position that the left optical module 526 and the right optical module 528 have been moved laterally toward each other as a result of engagement of the first contact surface 555 and the second contact surface 556 of the second adjuster portion 536 with the first contact surface 553 and the second contact surface 554 of the first adjuster portion 512.

The second device portion 504 is connectable to and disconnectable from the first device portion 502 by engagement and disengagement of the first coupler portion 510 of the first device portion 502 with the second coupler portion 534 of the second device portion 504. Connection and disconnection of the first coupler portion 510 and the second coupler portion 534 allows movement of the first device portion 502 and the second device portion 504 between the disconnected position (FIG. 5) and the connected position (FIG. 6). As previously described, the first coupler portion 510 and the second coupler portion 534 may be physical connection structures, magnetic connection structures, or other types of connection structures.

The second adjuster portion 536 of the second device portion 504 is configured to cause the left optical module 526 and the right optical module 528 of the first device portion to move to a specific lateral spacing with respect to each other in the connected position, which corresponds to a specific IPD that is therefore set by connection of the second device portion 504 to the first device portion 502. Several similarly configured second device portions may be made for use with the first device portion 502, and each of the several similarly configured device portions may have a differently configured second adjuster portion (by a fixed configuration or adjustable configuration) that corresponds to a specific IPD. This allows each of several users to use the first device portion 502 with their own user-specific instance of the second device portion 504.

Figure 7:
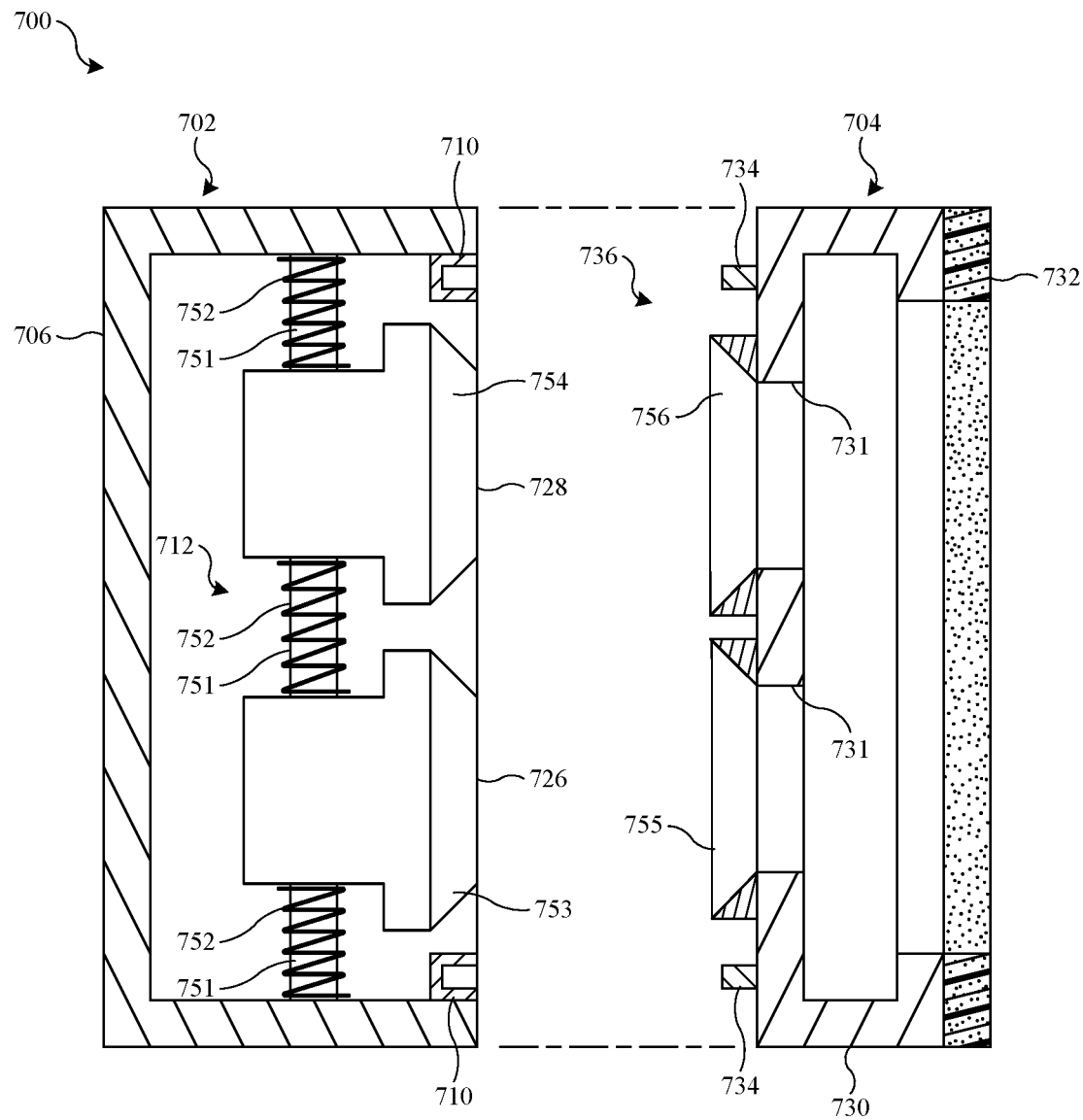
FIG. 7 is a top-down cross-section illustration that shows a third example of a head-mounted device with a first device portion and a second device portion of the head-mounted device shown in a disconnected position.
Figure 8:
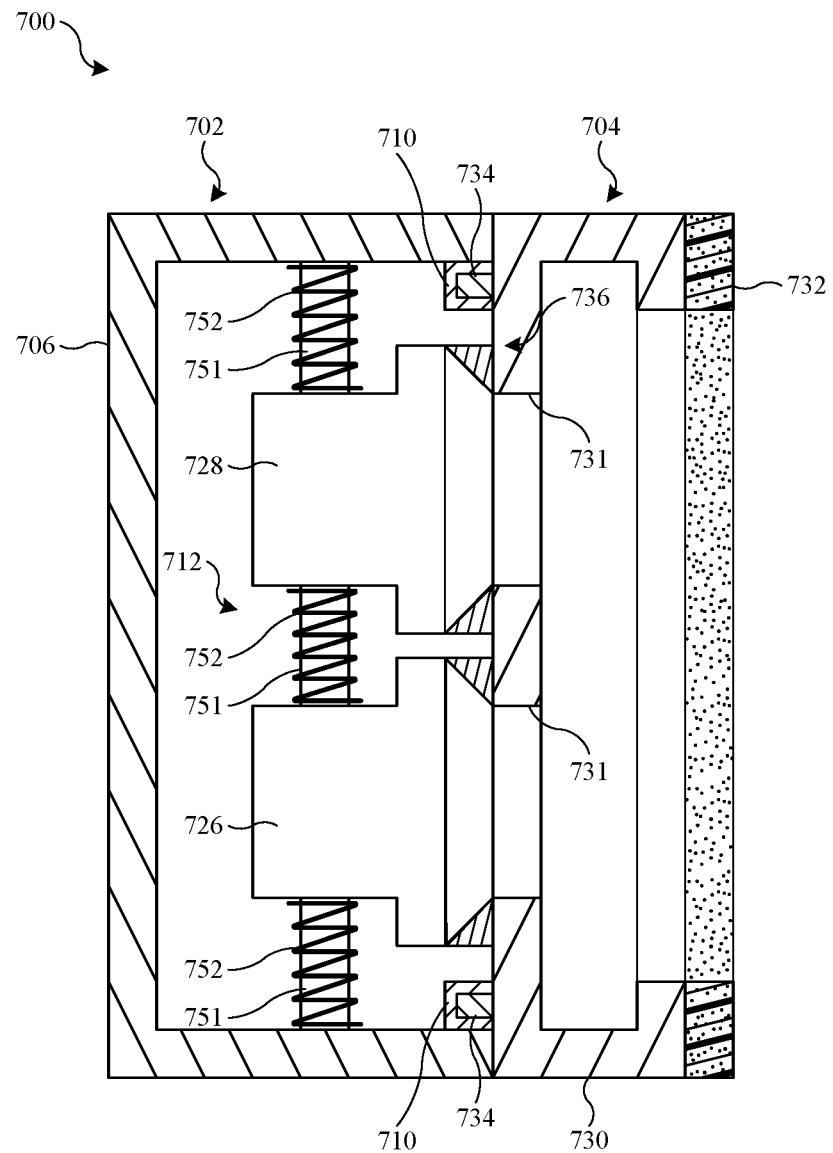
FIG. 8 is a top-down cross-section illustration that shows the third example of the head-mounted device with the first device portion and the second device portion of the head-mounted device shown in a connected position.

FIG. 7 is an illustration that shows a third example of a head-mounted device 700 with a first device portion 702 and a second device portion of the head-mounted device 700 shown in a disconnected position. FIG. 8 is an illustration that shows the third example of the head-mounted device 700 with the first device portion 702 and the second device portion 704 of the head-mounted device 700 shown in a connected position.

The head-mounted device 700 may be implemented in the manner described with respect to the head-mounted device 100 except as stated otherwise herein, and the description of the head-mounted device 100 and its components from FIGS. 1-2 is hereby incorporated by reference in the description of the head-mounted device 700.

The first device portion 702 of the head-mounted device 700 includes a primary housing 706, a first coupler portion 710, a first adjuster portion 712, a left optical module 726, and a right optical module 728. The second device portion 704 of the head-mounted device 700 includes a secondary housing 730, a face cushion 732, a second coupler portion 734, and a second adjuster portion 736. Openings 731 are formed in the secondary housing 730 to allow visibility of the left optical module 726 and the right optical module 728 when the head-mounted device 700 is worn by a user. Other components may be included in the first device portion 702 and the second device portion 704 of the head-mounted device 700, including components that were described with respect to the head-mounted device 100.

The first adjuster portion 712 and the second adjuster portion 736 cooperate to define an IPD adjustment assembly. The IPD adjustment assembly allows a distance between an optical axis of the left optical module 726 and an optical axis of the right optical module 728 to be adjusted between a minimum IPD and a maximum IPD.

In the illustrated example, the first adjuster portion 712 is an assembly that includes a rail 751 and springs 752. The rail 751 may be located in the primary housing 706 and fixed with respect to the primary housing 706. The left optical module 726 and the right optical module 728 are connected to the rail 751 and supported with respect to the rail 751 to allow lateral (side-to-side) sliding of the left optical module 726 and the right optical module 728 with respect to the rail 751 and with respect to the primary housing 706. The rail 751 may be any structural element that allows the left optical module 726 and the right optical module 728 to be mounted to it in a manner that allows sliding. The rail 751 may be a single structure or may include multiple structures. Sliding motion of the left optical module 726 and the right optical module 728 with respect to the rail includes sliding of the left optical module 726 and the right optical module 728 toward one another to decrease the IPD and sliding of the left optical module 726 and the right optical module 728 away from one another to increase the IPD.

The springs 752 define an initial position for the left optical module 726 and the right optical module 728 in the disconnected position. The springs 752 resist lateral movement of the left optical module 726 and the right optical module 728 relative to a neutral position. As an example, the neutral position may be a position in which the IPD is between a minimum IPD value and a maximum IPD value. In the illustrated implementation, the springs 752 include a compression spring that is located laterally between the left optical module 726 and the right optical module 728 as well as compression springs that are located laterally outward from the left optical module 726 and the right optical module 728. In an alternative implementation, the spring 752 may be replaced by one or more springs that have a different configuration and are likewise configured to resist lateral movement of the left optical module 726 and the right optical module 728 away from a neutral position.

The first adjuster portion 712 also includes a first contact surface 753 and a second contact surface 754. The first contact surface 753 is an annular surface (e.g., a first annular contact surface) formed on or connected to the left optical module 726 such that it extends around the left optical module 726 and defines an outward facing surface that is inclined relative to the longitudinal direction (e.g., front-rear direction that generally corresponds to the optical axes of the optical modules). The second contact surface 754 is an annular surface (e.g., a second annular contact surface) formed on or connected to the right optical module 728 such that it extends around the right optical module 728 and defines an outward facing surface that is inclined relative to the longitudinal direction (e.g., front-rear direction that generally corresponds to the optical axes of the optical modules).

The second adjuster portion 736 also includes a first contact surface 755 and a second contact surface 756. The first contact surface 755 is formed on or connected to the secondary housing 730 and is an annular structure that includes an inward facing inclined surface that generally corresponds to and is complementary to the position and geometry of the first contact surface 753 of the first adjuster portion 712 of the first device portion 702. The second contact surface 756 is formed on or connected to the secondary housing 730 and is an annular structure that includes an inward facing inclined surface that generally corresponds to and is complementary to the position and geometry of the second contact surface 754 of the first adjuster portion 712 of the first device portion 702.

The first contact surface 755 and the second contact surface 756 of the second device portion 704 are configured to engage the first contact surface 753 and the second contact surface 754 of the first device portion 702 during connection of the second device portion 704 to the first device portion 702 to move the left optical module 726 and the right optical module 728 laterally in dependence on an offset between the first contact surface 755 and the second contact surface 756 of the second device portion 704 with respect to the first contact surface 753 and the second contact surface 754 of the first device portion 702. Thus, connecting the second device portion 704 to the first device portion 702 causes engagement of the first contact surface 755 of the second device portion 704 with the first contact surface 753 of the left optical module 726, which shifts the position of the left optical module 726 into alignment with the first contact surface 755 of the second device portion 704. Connecting the second device portion 704 to the first device portion 702 also causes engagement of the second contact surface 756 of the second device portion 704 with the second contact surface 754 of the right optical module 728, which shifts the position of the right optical module 728 into alignment with the second contact surface 756 of the second device portion 704. Due to the annular nature of the contact surfaces, this configuration may also be used to drive vertical adjustment of the left optical module 726 and the right optical module 728 in implementations that include a vertical position adjustment stage for the left optical module 726 and the right optical module 728, as will be explained further herein.

The second device portion 704 is connectable to and disconnectable from the first device portion 702 by engagement and disengagement of the first coupler portion 710 of the first device portion 702 with the second coupler portion 734 of the second device portion 704. Connection and disconnection of the first coupler portion 710 and the second coupler portion 734 allows movement of the first device portion 702 and the second device portion 704 between the disconnected position (FIG. 7) and the connected position (FIG. 8). As previously described, the first coupler portion 710 and the second coupler portion 734 may be physical connection structures, magnetic connection structures, or other types of connection structures.

The second adjuster portion 736 of the second device portion 704 is configured to cause the left optical module 726 and the right optical module 728 of the first device portion to move to a specific lateral spacing with respect to each other in the connected position, which corresponds to a specific IPD that is therefore set by connection of the second device portion 704 to the first device portion 702. Several similarly configured second device portions may be made for use with the first device portion 702, and each of the several similarly configured device portions may have a differently configured second adjuster portion (by a fixed configuration or adjustable configuration) that corresponds to a specific IPD. This allows each of several users to use the first device portion 702 with their own user-specific instance of the second device portion 704.

Figure 9:
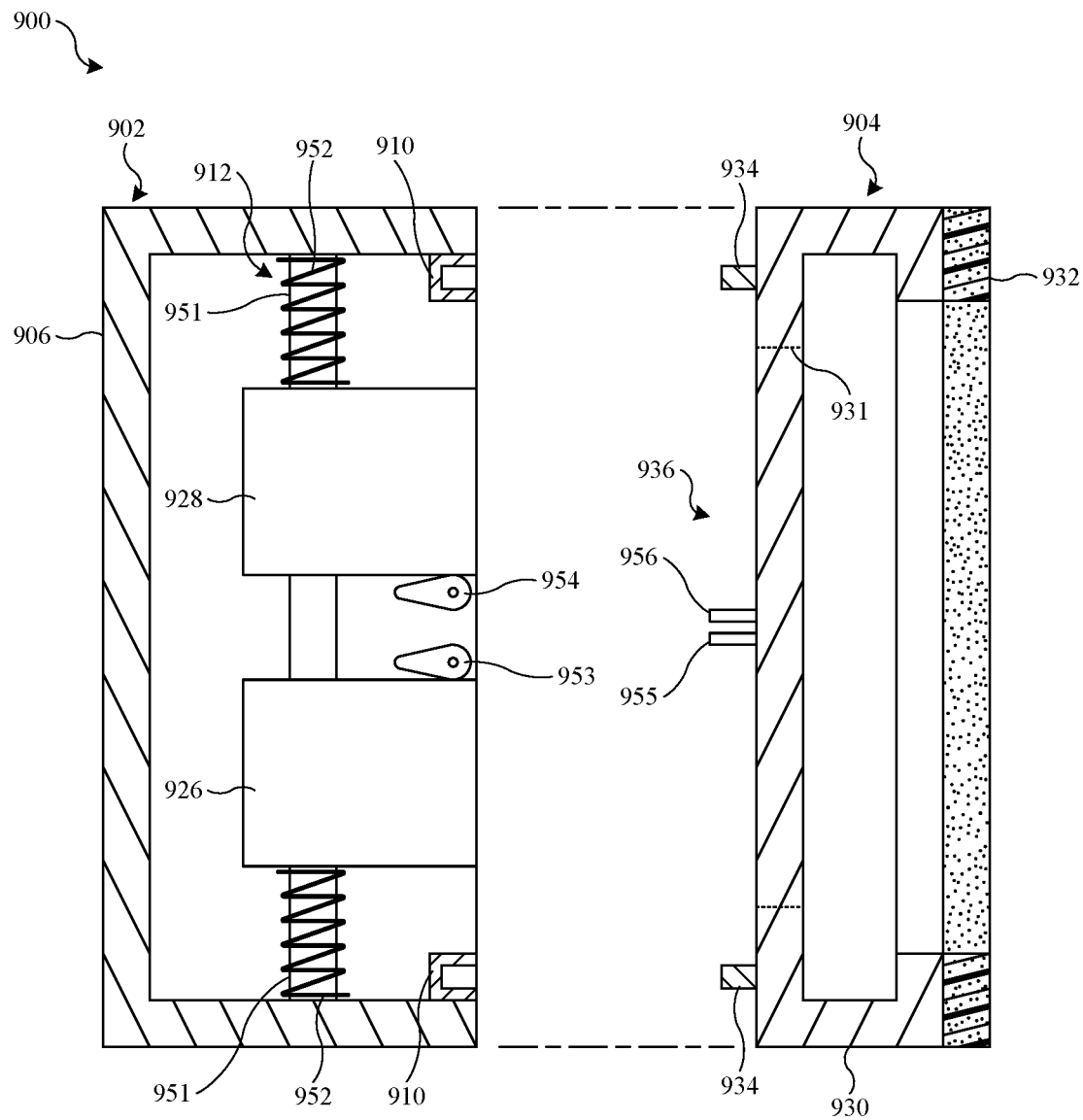
FIG. 9 is a top-down cross-section illustration that shows a fourth example of a head-mounted device with a first device portion and a second device portion of the head-mounted device shown in a disconnected position.
Figure 10:
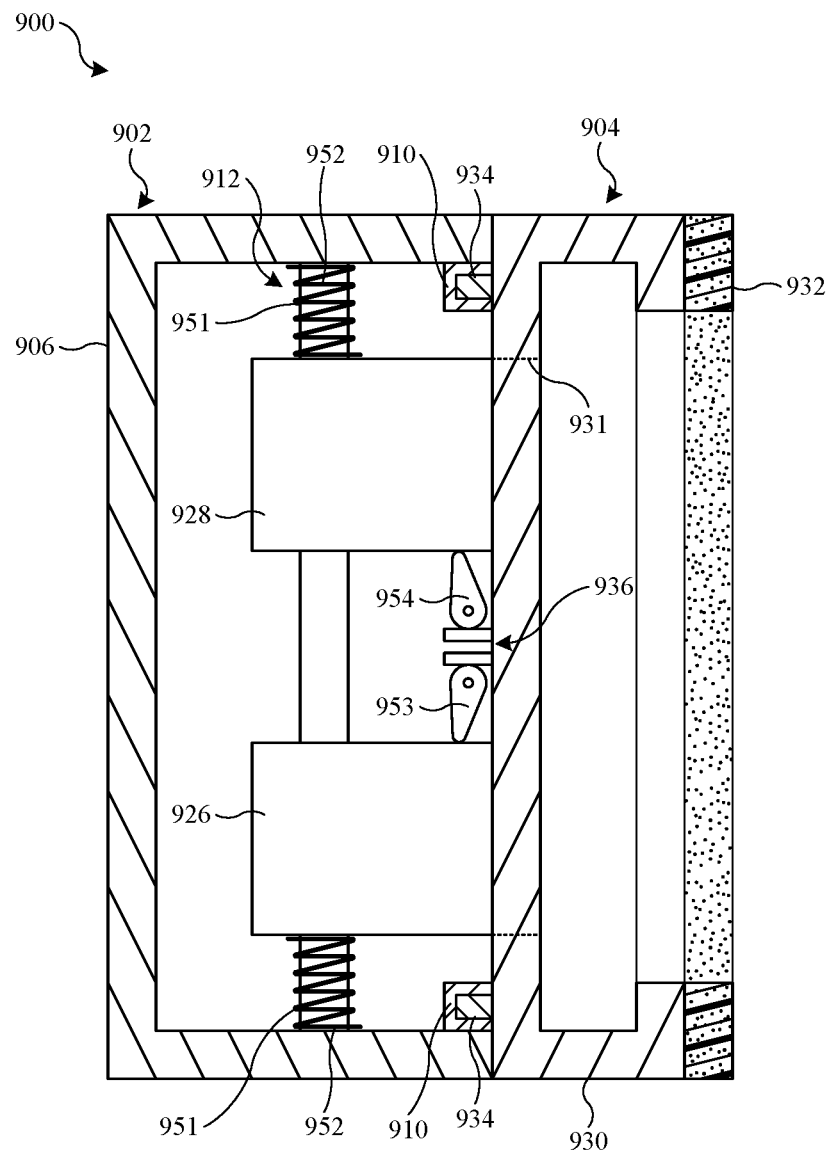
FIG. 10 is a top-down cross-section illustration that shows the fourth example of the head-mounted device with the first device portion and the second device portion of the head-mounted device shown in a connected position.

FIG. 9 is a top-down cross-section illustration that shows a fourth example of a head-mounted device 900 with a first device portion 902 and a second device portion of the head-mounted device 900 shown in a disconnected position. FIG. 10 is a top-down cross-section illustration that shows the fourth example of the head-mounted device 900 with the first device portion 902 and the second device portion 904 of the head-mounted device 900 shown in a connected position.

The head-mounted device 900 may be implemented in the manner described with respect to the head-mounted device 100 except as stated otherwise herein, and the description of the head-mounted device 100 and its components from FIGS. 1-2 is hereby incorporated by reference in the description of the head-mounted device 900.

The first device portion 902 of the head-mounted device 900 includes a primary housing 906, a first coupler portion 910, a first adjuster portion 912, a left optical module 926, and a right optical module 928. The second device portion 904 of the head-mounted device 900 includes a secondary housing 930, a face cushion 932, a second coupler portion 934, and a second adjuster portion 936. An opening 931 is formed in the secondary housing 930 to allow visibility of the left optical module 926 and the right optical module 928 when the head-mounted device 900 is worn by a user. Other components may be included in the first device portion 902 and the second device portion 904 of the head-mounted device 900, including components that were described with respect to the head-mounted device 100.

The first adjuster portion 912 and the second adjuster portion 936 cooperate to define an IPD adjustment assembly. The IPD adjustment assembly allows a distance between an optical axis of the left optical module 926 and an optical axis of the right optical module 928 to be adjusted between a minimum IPD and a maximum IPD.

In the illustrated example, the first adjuster portion 912 is an assembly that includes a rail 951 and springs 952. The rail 951 may be located in the primary housing 906 and fixed with respect to the primary housing 906. The left optical module 926 and the right optical module 928 are connected to the rail 951 and supported with respect to the rail 951 to allow lateral (side-to-side) sliding of the left optical module 926 and the right optical module 928 with respect to the rail 951 and with respect to the primary housing 906 (e.g., the left optical module 926 and the right optical module 928 are slidably mounted to the rail 951). The rail 951 may be any structural element that allows the left optical module 926 and the right optical module 928 to be mounted to it in a manner that allows sliding. The rail 951 may be a single structure or may include multiple structures. Sliding motion of the left optical module 926 and the right optical module 928 with respect to the rail includes sliding of the left optical module 926 and the right optical module 928 toward one another to decrease the IPD and sliding of the left optical module 926 and the right optical module 928 away from one another to increase the IPD.

The springs 952 define an initial position for the left optical module 926 and the right optical module 928 in the disconnected position. The springs 952 resist movement of the left optical module 926 and the right optical module 928 in a laterally outward direction with respect to the rail 951 and urge the left optical module 926 and the right optical module 928 toward each other in a laterally inward direction. In the illustrated implementation, the springs 952 are compression springs that are located laterally outward from the left optical module 926 and the right optical module 928. In an alternative implementation, the springs 952 may be replaced by one or more springs that have a different configuration and are likewise configured to resist movement of the left optical module 926 and the right optical module 928 in a laterally outward direction with respect to the rail 951 and urge the left optical module 926 and the right optical module 928 toward each other in a laterally inward direction. For example, the springs 952 could be replaced by one or more tension springs that are located between the left optical module 926 and the right optical module 928 and which are configured to urge the left optical module 926 and the right optical module 928 laterally inward.

The first adjuster portion 912 also includes a first cam 953 and a second cam 954. The first cam 953 is located in the primary housing 906 adjacent to the left optical module 926 and is positioned at a laterally inward location relative to the left optical module 926. The second cam 954 is located in the primary housing 906 adjacent to the right optical module 928 and is positioned at a laterally inward location relative to the right optical module 928. A similar configuration could be implemented with the first cam 953 and the second cam 954 positioned laterally outward from the left optical module 926 and the right optical module 928. The first cam 953 and the second cam 954 are each arranged around a rotation axis (e.g., an axle) and the distance between the rotation axis and the outer periphery of each of the first cam 953 and the second cam 954 varies between a minimum distance and a maximum distance.

The second adjuster portion 936 also includes a first engaging structure 955 and a second engaging structure 956. The first engaging structure 955 and the second engaging structure 956 are formed on or connected to the secondary housing 930 of the second device portion 904. In the illustrated example, the first engaging structure 955 and the second engaging structure 956 are protruding members that are configured to engage the first cam 953 and the second cam 954 and thereby cause rotation of the first cam 953 and the second cam 954 as the second device portion 904 is moved into the connected position with respect to the first device portion 902. To cause rotation of the first cam 953 and the second cam 954, any suitable configuration can be used for the first engaging structure 955 and the second engaging structure 956, such as a high-friction engaging surface or a gear track. When the first cam 953 and the second cam 954 rotate, they engage the left optical module 926 and the right optical module 928, which changes the distance between the rotation axes of each of the first cam 953 and the second cam 954 with respect to the left optical module 926 and the right optical module 928 in accordance with the geometric configuration of the outer periphery of the first cam 953 and the second cam 954.

The first cam 953 and the second cam 954 are examples of mechanical amplifiers in that they are operable to shift the position of the left optical module 926 and the right optical module 928 by a distance that is greater than the length of the effective mechanical stroke of the first engaging structure 955 and the second engaging structure 956 as they enter the primary housing 906 of the first device portion 902 and engage the first cam 953 and the second cam 954. Other types of mechanical amplifiers can be used in a similar configuration in place of the first cam 953 and the second cam 954. Examples of mechanical amplifiers include levers, cam tracks, four bar linkages, etc.

The second device portion 904 is connectable to and disconnectable from the first device portion 902 by engagement and disengagement of the first coupler portion 910 of the first device portion 902 with the second coupler portion 934 of the second device portion 904. Connection and disconnection of the first coupler portion 910 and the second coupler portion 934 allows movement of the first device portion 902 and the second device portion 904 between the disconnected position (FIG. 9) and the connected position (FIG. 10). As previously described, the first coupler portion 910 and the second coupler portion 934 may be physical connection structures, magnetic connection structures, or other types of connection structures.

The second adjuster portion 936 of the second device portion 904 is configured to cause the left optical module 926 and the right optical module 928 of the first device portion to move to a specific lateral spacing with respect to each other in the connected position, which corresponds to a specific IPD that is therefore set by connection of the second device portion 904 to the first device portion 902. Several similarly configured second device portions may be made for use with the first device portion 902, and each of the several similarly configured device portions may have a differently configured second adjuster portion (by a fixed configuration or adjustable configuration) that corresponds to a specific IPD. This allows each of several users to use the first device portion 902 with their own user-specific instance of the second device portion 904.

Figure 11:
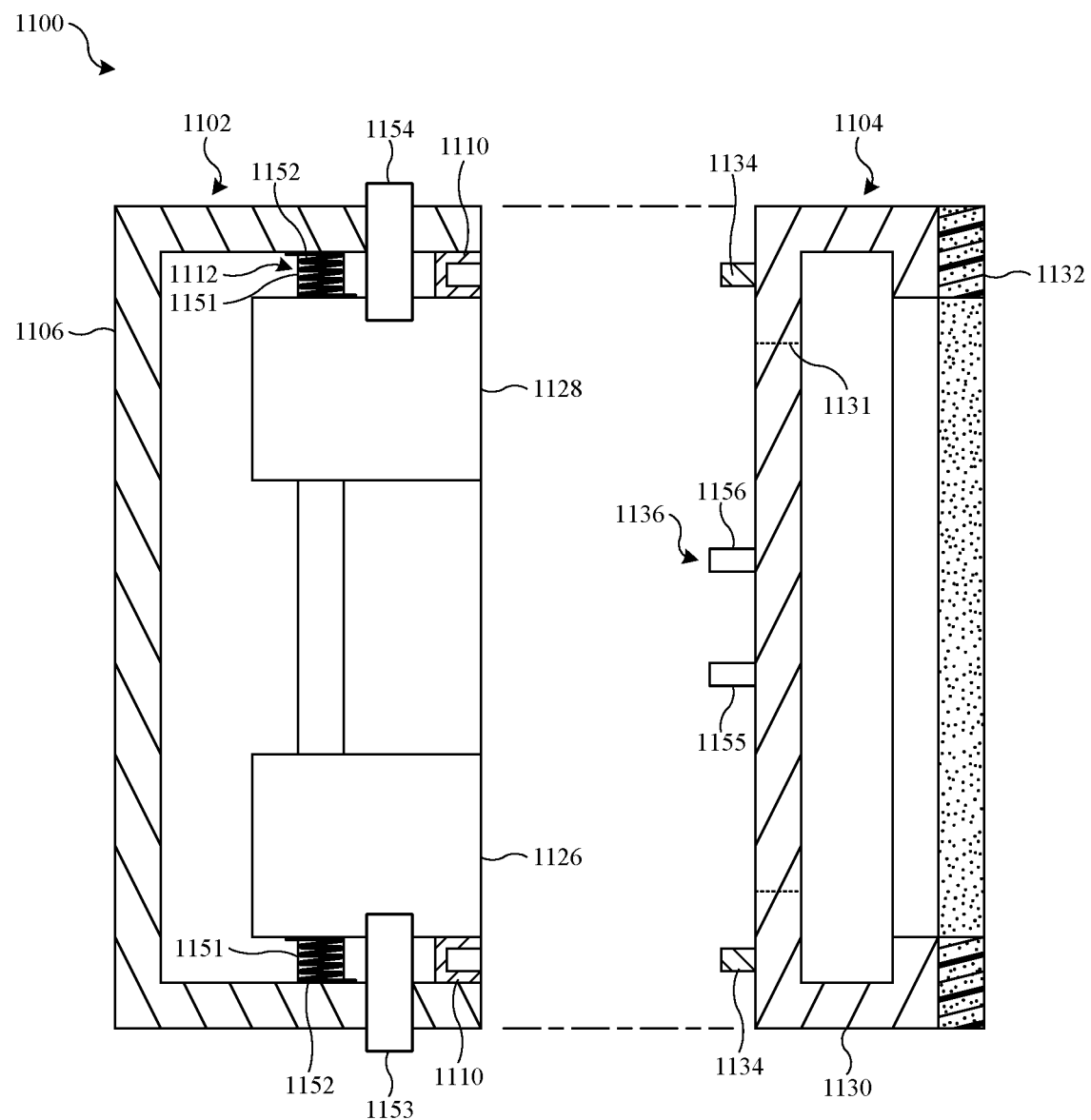
FIG. 11 is a top-down cross-section illustration that shows a fifth example of a head-mounted device with a first device portion and a second device portion of the head-mounted device shown in a disconnected position.
Figure 12:
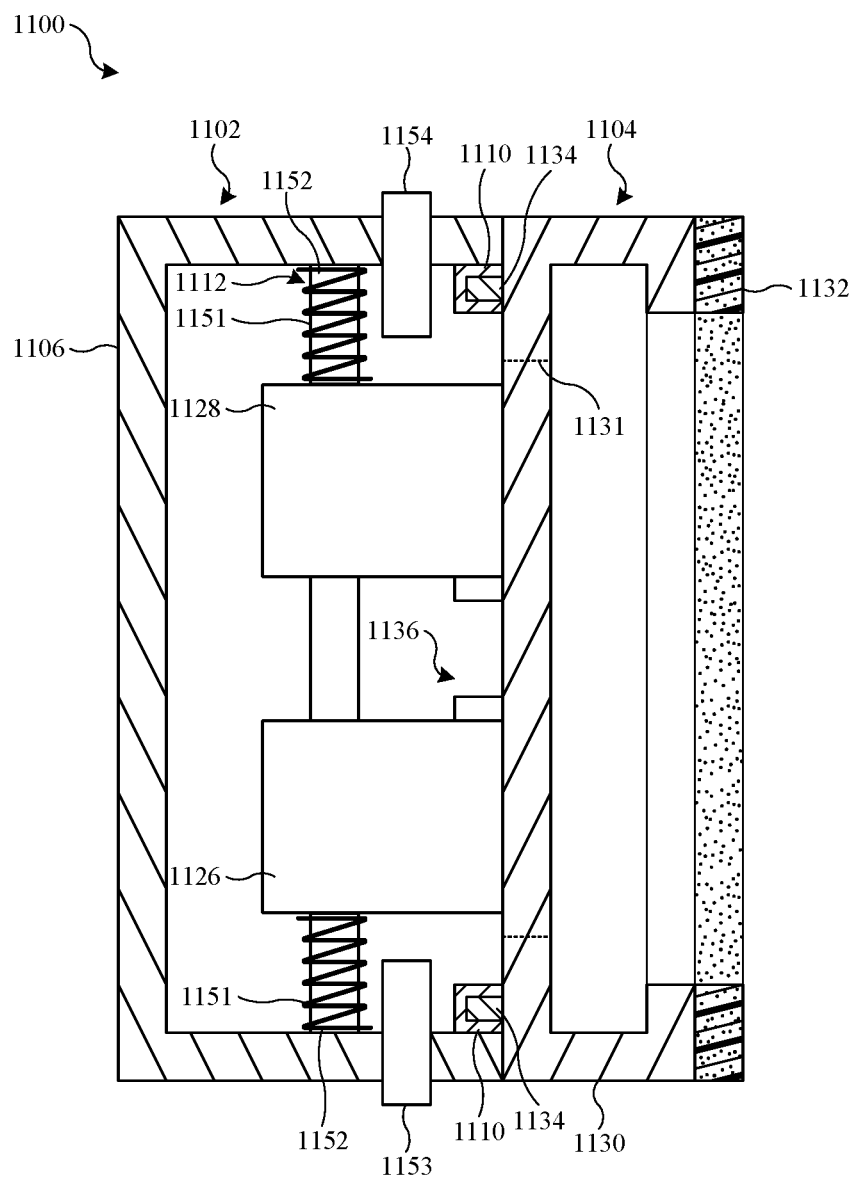
FIG. 12 is a top-down cross-section illustration that shows the fifth example of the head-mounted device with the first device portion and the second device portion of the head-mounted device shown in a connected position.

FIG. 11 is an illustration that shows a fifth example of a head-mounted device 1100 with a first device portion 1102 and a second device portion of the head-mounted device 1100 shown in a disconnected position. FIG. 12 is an illustration that shows the fifth example of the head-mounted device 1100 with the first device portion 1102 and the second device portion 1104 of the head-mounted device 1100 shown in a connected position.

The head-mounted device 1100 may be implemented in the manner described with respect to the head-mounted device 100 except as stated otherwise herein, and the description of the head-mounted device 100 and its components from FIGS. 1-2 is hereby incorporated by reference in the description of the head-mounted device 1100.

The first device portion 1102 of the head-mounted device 1100 includes a primary housing 1106, a first coupler portion 1110, a first adjuster portion 1112, a left optical module 1126, and a right optical module 1128. The second device portion 1104 of the head-mounted device 1100 includes a secondary housing 1130, a face cushion 1132, a second coupler portion 1134, and a second adjuster portion 1136. An opening 1131 is formed in the secondary housing 1130 to allow visibility of the left optical module 1126 and the right optical module 1128 when the head-mounted device 1100 is worn by a user. Other components may be included in the first device portion 1102 and the second device portion 1104 of the head-mounted device 1100, including components that were described with respect to the head-mounted device 100.

The first adjuster portion 1112 and the second adjuster portion 1136 cooperate to define an IPD adjustment assembly. The IPD adjustment assembly allows a distance between an optical axis of the left optical module 1126 and an optical axis of the right optical module 1128 to be adjusted between a minimum IPD and a maximum IPD.

In the illustrated example, the first adjuster portion 1112 is an assembly that includes a rail 1151, springs 1152, a first releasable locking structure 1153, and a second releasable locking structure 1154. The rail 1151 may be located in the primary housing 1106 and fixed with respect to the primary housing 1106. The left optical module 1126 and the right optical module 1128 are connected to the rail 1151 and supported with respect to the rail 1151 to allow lateral (side-to-side) sliding of the left optical module 1126 and the right optical module 1128 with respect to the rail 1151 and with respect to the primary housing 1106. The rail 1151 may be any structural element that allows the left optical module 1126 and the right optical module 1128 to be mounted to it in a manner that allows sliding. The rail 1151 may be a single structure or may include multiple structures. Sliding motion of the left optical module 1126 and the right optical module 1128 with respect to the rail includes sliding of the left optical module 1126 and the right optical module 1128 toward one another to decrease the IPD and sliding of the left optical module 1126 and the right optical module 1128 away from one another to increase the IPD.

The springs 1152 define an initial position for the left optical module 1126 and the right optical module 1128 in the disconnected position. The springs 1152 resists movement of the left optical module 1126 and the right optical module 1128 in a laterally outward direction with respect to the rail 1151 and urges the left optical module 1126 and the right optical module 1128 toward from each other in a laterally inward direction. In the illustrated implementation, the springs 1152 is a compression springs that are located laterally outward relative to the left optical module 1126 and the right optical module 1128. In an alternative implementation, the spring 1152 may be replaced by one or more springs that have a different configuration and are likewise configured to resist movement of the left optical module 1126 and the right optical module 1128 in a laterally outward direction with respect to the rail 1151 and urge the left optical module 1126 and the right optical module 1128 toward from each other in a laterally inward direction. For example, the springs 1152 could be replaced by a tension spring that is located between the left optical module 1126 and the right optical module 1128 and which are configured to urge the left optical module 1126 and the right optical module 1128 laterally inward toward a lateral center of the primary housing 1106.

The first adjuster portion 1112 also includes the first releasable locking structure 1153 and the second releasable locking structure 1154. The first releasable locking structure 1153 and the second releasable locking structure 1154 engageable with the left optical module and the right optical module 1128 to hold them at a laterally outward position near the lateral side walls of the primary housing 306 and against the force applied by the springs 1152 (e.g., the springs 1152 are held in a compressed position). The first releasable locking structure 1153 and the second releasable locking structure 1154 are any type of device that is configured to hold the left optical module 1126 and the right optical module 1128 in the laterally outward position when the first device portion 1102 and the second device portion 1104 are in the disconnected position. As examples, the first releasable locking structure 1153 and the second releasable locking structure 1154 may be or include latches, hooks, magnetic elements, etc. The first releasable locking structure 1153 and the second releasable locking structure 1154 are configured to be released, such as by user operation of a switch or by engagement of a part of the second device portion 304 during movement from the disconnected position to the connected position.

The second adjuster portion 1136 also includes a first stop surface 1155 and a second stop surface 1156 that control movement of the left optical module 1126 and the right optical module 1128 to allow the left optical module 1126 and the right optical module 1128 to move to an adjusted position. The first stop surface 1155 and the second stop surface 1156 are positioned (fixed or adjustably) on the secondary housing 1130 at locations that correspond to a desired IPD between the left optical module 1126 and the right optical module 1128. Upon connection of the second device portion 1104 to the first device portion 1102, the first releasable locking structure 1153 and the second releasable locking structure 1154 are operated to release the left optical module 1126 and the right optical module 1128, causing them to move laterally inward under the forces applied by the springs 1152 until the left optical module 1126 reaches and engages the first stop surface 1155 and the right optical module 1128 reaches and engages the second stop surface 1156. Engagement with the first stop surface 1155 and the second stop surface 1156 ceases inward movement of the left optical module 1126 and the right optical module 1128, thereby setting the IPD according to the locations of the first stop surface 1155 and the second stop surface 1156.

The second device portion 1104 is connectable to and disconnectable from the first device portion 1102 by engagement and disengagement of the first coupler portion 1110 of the first device portion 1102 with the second coupler portion 1134 of the second device portion 1104. Connection and disconnection of the first coupler portion 1110 and the second coupler portion 1134 allows movement of the first device portion 1102 and the second device portion 1104 between the disconnected position (FIG. 11) and the connected position (FIG. 12). As previously described, the first coupler portion 1110 and the second coupler portion 1134 may be physical connection structures, magnetic connection structures, or other types of connection structures.

The second adjuster portion 1136 of the second device portion 1104 is configured to cause the left optical module 1126 and the right optical module 1128 of the first device portion to move to a specific lateral spacing with respect to each other in the connected position, which corresponds to a specific IPD that is therefore set by connection of the second device portion 1104 to the first device portion 1102. Several similarly configured second device portions may be made for use with the first device portion 1102, and each of the several similarly configured device portions may have a differently configured second adjuster portion (by a fixed configuration or adjustable configuration) that corresponds to a specific IPD. This allows each of several users to use the first device portion 1102 with their own user-specific instance of the second device portion 1104.

Figure 13:
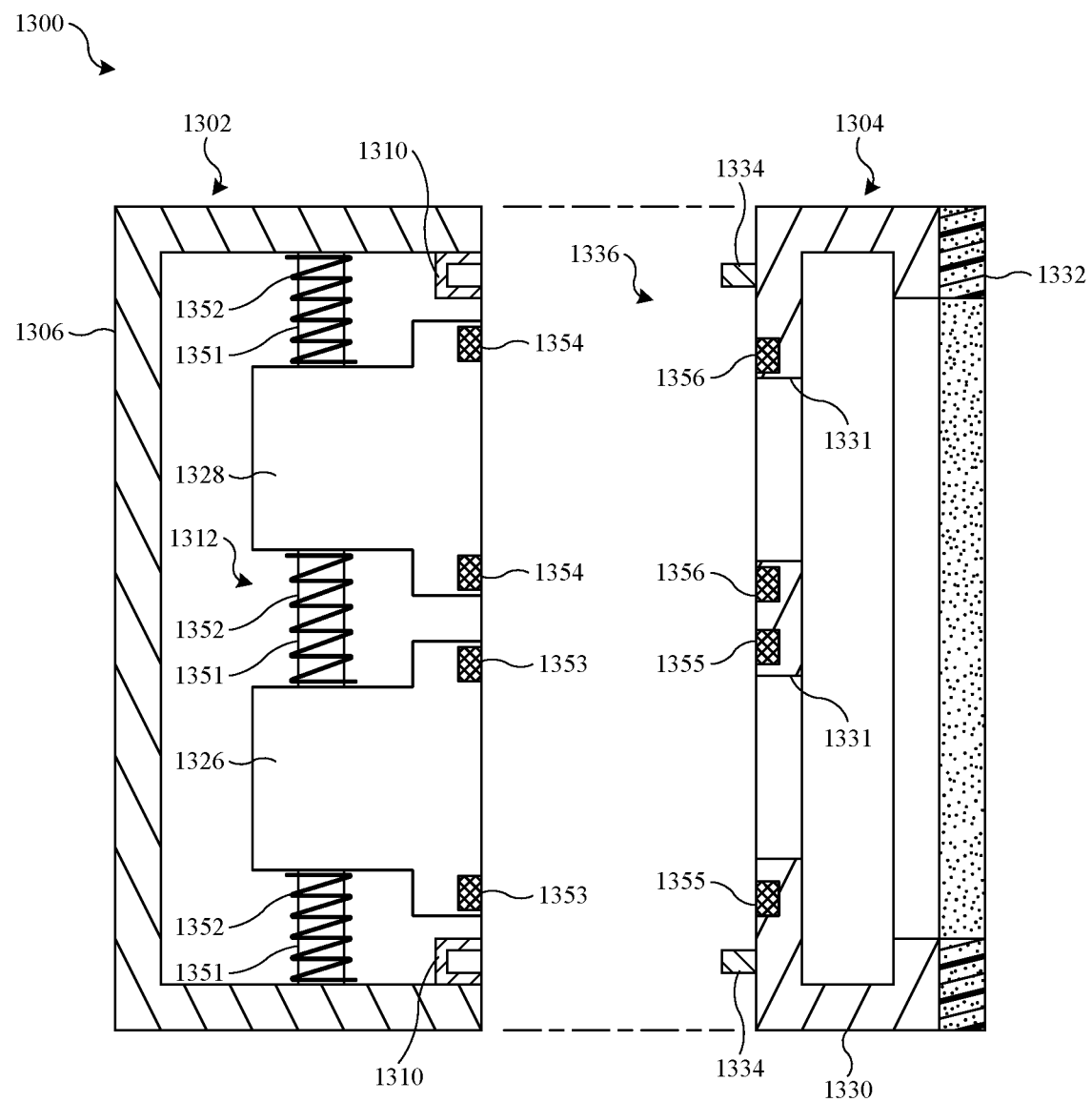
FIG. 13 is a top-down cross-section illustration that shows a sixth example of a head-mounted device with a first device portion and a second device portion of the head-mounted device shown in a disconnected position.
Figure 14:
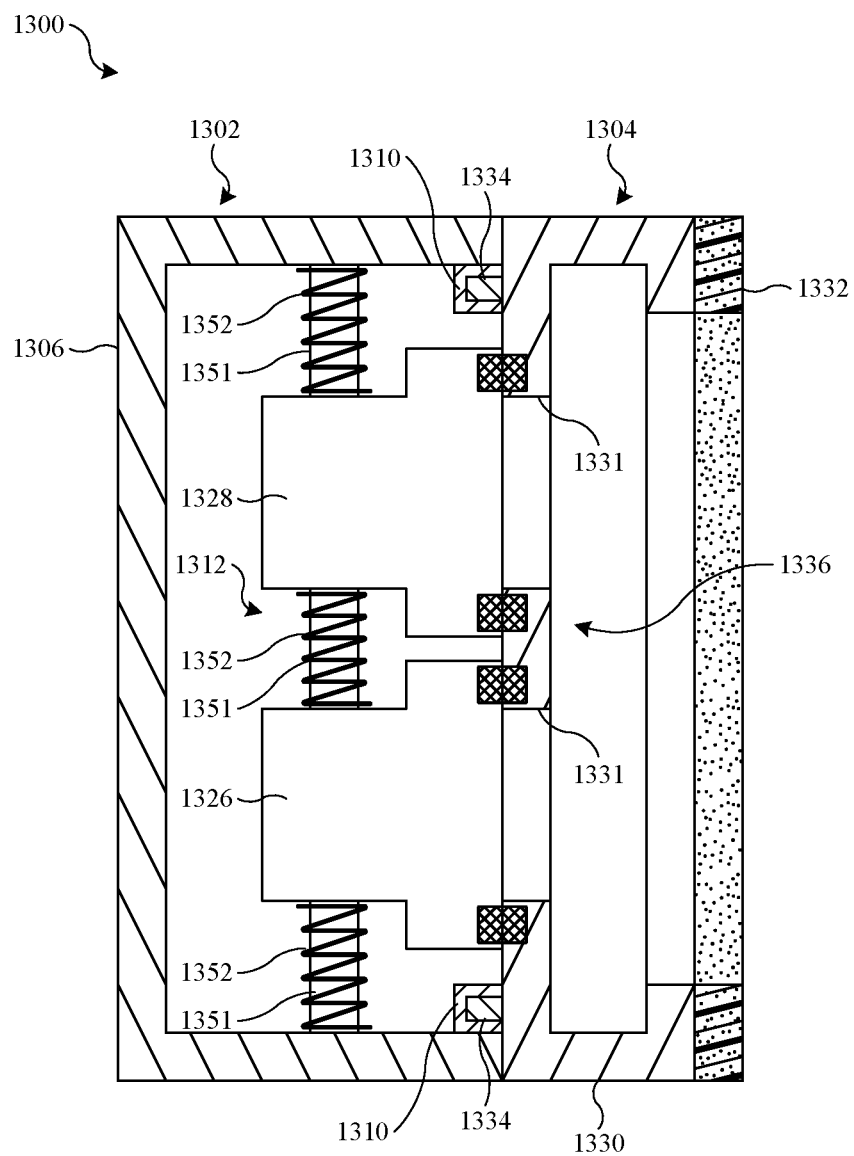
FIG. 14 is a top-down cross-section illustration that shows the sixth example of the head-mounted device with the first device portion and the second device portion of the head-mounted device shown in a connected position.

FIG. 13 is an illustration that shows a sixth example of a head-mounted device 1300 with a first device portion 1302 and a second device portion of the head-mounted device 1300 shown in a disconnected position. FIG. 14 is an illustration that shows the sixth example of the head-mounted device 1300 with the first device portion 1302 and the second device portion 1304 of the head-mounted device 1300 shown in a connected position.

The head-mounted device 1300 may be implemented in the manner described with respect to the head-mounted device 100 except as stated otherwise herein, and the description of the head-mounted device 100 and its components from FIGS. 1-2 is hereby incorporated by reference in the description of the head-mounted device 1300.

The first device portion 1302 of the head-mounted device 1300 includes a primary housing 1306, a first coupler portion 1310, a first adjuster portion 1312, a left optical module 1326, and a right optical module 1328. The second device portion 1304 of the head-mounted device 1300 includes a secondary housing 1330, a face cushion 1332, a second coupler portion 1334, and a second adjuster portion 1336. Openings 1331 are formed in the secondary housing 1330 to allow visibility of the left optical module 1326 and the right optical module 1328 when the head-mounted device 1300 is worn by a user. Other components may be included in the first device portion 1302 and the second device portion 1304 of the head-mounted device 1300, including components that were described with respect to the head-mounted device 100.

The first adjuster portion 1312 and the second adjuster portion 1336 cooperate to define an IPD adjustment assembly. The IPD adjustment assembly allows a distance between an optical axis of the left optical module 1326 and an optical axis of the right optical module 1328 to be adjusted between a minimum IPD and a maximum IPD.

In the illustrated example, the first adjuster portion 1312 is an assembly that includes a rail 1351 and springs 1352. The rail 1351 may be located in the primary housing 1306 and fixed with respect to the primary housing 1306. The left optical module 1326 and the right optical module 1328 are connected to the rail 1351 and supported with respect to the rail 1351 to allow lateral (side-to-side) sliding of the left optical module 1326 and the right optical module 1328 with respect to the rail 1351 and with respect to the primary housing 1306. The rail 1351 may be any structural element that allows the left optical module 1326 and the right optical module 1328 to be mounted to it in a manner that allows sliding. The rail 1351 may be a single structure or may include multiple structures. Sliding motion of the left optical module 1326 and the right optical module 1328 with respect to the rail includes sliding of the left optical module 1326 and the right optical module 1328 toward one another to decrease the IPD and sliding of the left optical module 1326 and the right optical module 1328 away from one another to increase the IPD.

The springs 1352 define an initial position for the left optical module 1326 and the right optical module 1328 in the disconnected position. The springs 1352 resist lateral movement of the left optical module 1326 and the right optical module 1328 relative to a neutral position. As an example, the neutral position may be a position in which the IPD is between a minimum IPD value and a maximum IPD value. In the illustrated implementation, the springs 1352 include a compression spring that is located laterally between the left optical module 1326 and the right optical module 1328 as well as compression springs that are located laterally outward from the left optical module 1326 and the right optical module 1328. In an alternative implementation, the spring 1352 may be replaced by one or more springs that have a different configuration and are likewise configured to resist lateral movement of the left optical module 1326 and the right optical module 1328 away from a neutral position.

The first adjuster portion 1312 of the first device portion 1302 also includes a first group of magnetic connector components 1353 (magnetic and/or ferromagnetic components) and a second group of magnetic connector components 1354 (magnetic and/or ferromagnetic components). The first group of magnetic connector components 1353 includes one or more magnetic connector components that are connected to the left optical module 1326. The second group of magnetic connector components 1354 includes one or more magnetic connector components that are connected to the right optical module 1328.

The second adjuster portion 1336 of the second device portion 1304 includes a first group of magnetic connector components 1355 (magnetic and/or ferromagnetic components) and a second group of magnetic connector components 1356 (magnetic and/or ferromagnetic components). The first group of magnetic connector components 1355 includes one or more magnetic connector components that are connected to the secondary housing 1330 of the second device portion 1304 and positioned around the opening 1331 in general correspondence to the position of the left optical module 1326 and the first group of magnetic connector components 1353 of the first adjuster portion 1312 of the first device portion 1302. The second group of magnetic connector components 1356 includes one or more magnetic connector components that are connected to the secondary housing 1330 of the second device portion 1304 and positioned around the opening 1331 in general correspondence to the position of the right optical module 1328 and the second group of magnetic connector components 1354 of the first adjuster portion 1312 of the first device portion 1302.

The first group of magnetic connector components 1355 and the second group of magnetic connector components 1356 of the second device portion 1304 are configured to shift the position of the left optical module 1326 and the right optical module 1328 by magnetic attraction with respect to the first group of magnetic connector components 1353 and the second group of magnetic connector components 1354 of the first adjuster portion 1312 during connection of the second device portion 1304 to the first device portion 1302. Thus, the left optical module 1326 and the right optical module 1328 are moved laterally in dependence on an offset between the first group of magnetic connector components 1355 and the second group of magnetic connector components 1356 of the second device portion 1304 with respect to the first group of magnetic connector components 1353 and the second group of magnetic connector components 1354 of the first device portion 1302. Thus, connecting the second device portion 1304 to the first device portion 1302 shifts the position of the left optical module 1326 and the right optical module 1328 in dependence on the locations of the first group of magnetic connector components 1355 and the second first group of magnetic connector components 1356 to set the IPD based on the configuration of the second adjuster portion 1336 of the second device portion 1304.

In some implementations, the second device portion 1304 is configured according to a predetermined IPD setting by placing the first group of magnetic connector components 1355 and the second group of magnetic connector components 1356 of the second device portion 1304 at locations corresponding to the desired IPD setting during manufacture of the second device portion 1304.

In other implementations, the IPD setting of the second device portion is user configurable. As one example, the first group of magnetic connector components 1355 and the second group of magnetic connector components 1356 of the second device portion 1304 may be connectable and disconnectable to the secondary housing 1330 by mechanical connectors such as snaps, buttons, friction connectors, screws, bolts, or other connectors to allow the user to change the locations of the first group of magnetic connector components 1355 and the second group of magnetic connector components 1356 to set a desired IPD setting. As another example, the first group of magnetic connector components 1355 and the second group of magnetic connector components 1356 of the second device portion 1304 may include electropermanent magnets that can be changed from a first polarity to a second polarity (i.e., reversing the polar orientation of the magnetic field) by applying a magnetic field (e.g., by application of a current to a wire wound around part of the electropermanent magnet). By changing the polarities of certain components from the first group of magnetic connector components 1355 and the second group of magnetic connector components 1356 of the second device portion 1304, the IPD setting can be changed.

connectable and disconnectable to the secondary housing 1330 by mechanical connectors such as snaps, buttons, friction connectors, screws, bolts, or other connectors to allow the user to change the locations of the first group of magnetic connector components 1355 and the second group of magnetic connector components 1356 to set a desired IPD setting.

The second device portion 1304 is connectable to and disconnectable from the first device portion 1302 by engagement and disengagement of the first coupler portion 1310 of the first device portion 1302 with the second coupler portion 1334 of the second device portion 1304. Connection and disconnection of the first coupler portion 1310 and the second coupler portion 1334 allows movement of the first device portion 1302 and the second device portion 1304 between the disconnected position (FIG. 13) and the connected position (FIG. 14). As previously described, the first coupler portion 1310 and the second coupler portion 1334 may be physical connection structures, magnetic connection structures, or other types of connection structures.

The second adjuster portion 1336 of the second device portion 1304 is configured to cause the left optical module 1326 and the right optical module 1328 of the first device portion to move to a specific lateral spacing with respect to each other in the connected position, which corresponds to a specific IPD that is therefore set by connection of the second device portion 1304 to the first device portion 1302. Several similarly configured second device portions may be made for use with the first device portion 1302, and each of the several similarly configured device portions may have a differently configured second adjuster portion (by a fixed configuration or adjustable configuration) that corresponds to a specific IPD. This allows each of several users to use the first device portion 1302 with their own user-specific instance of the second device portion 1304.

Figure 15:
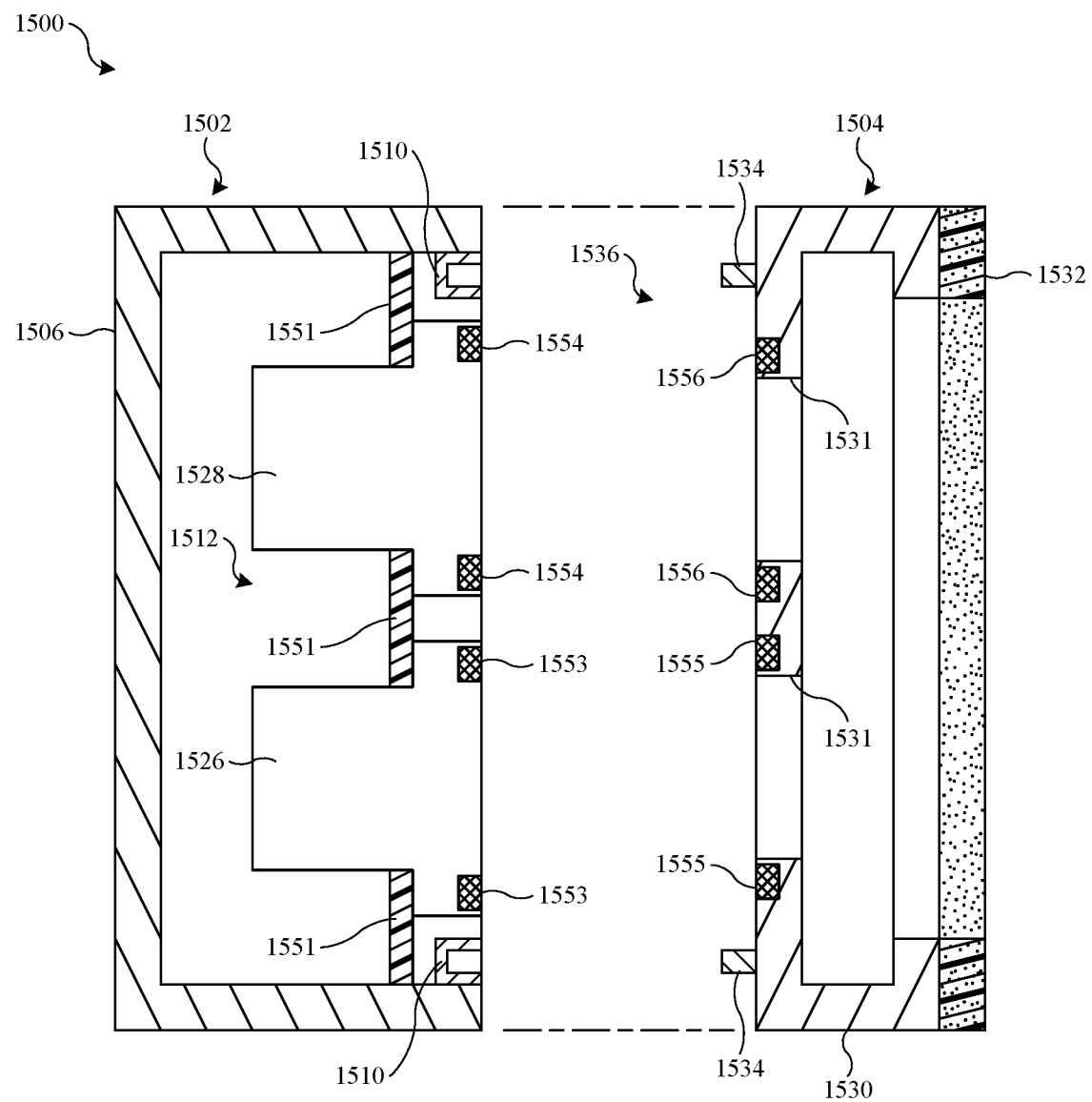
FIG. 15 is a top-down cross-section illustration that shows a seventh example of a head-mounted device with a first device portion and a second device portion of the head-mounted device shown in a disconnected position.
Figure 16:
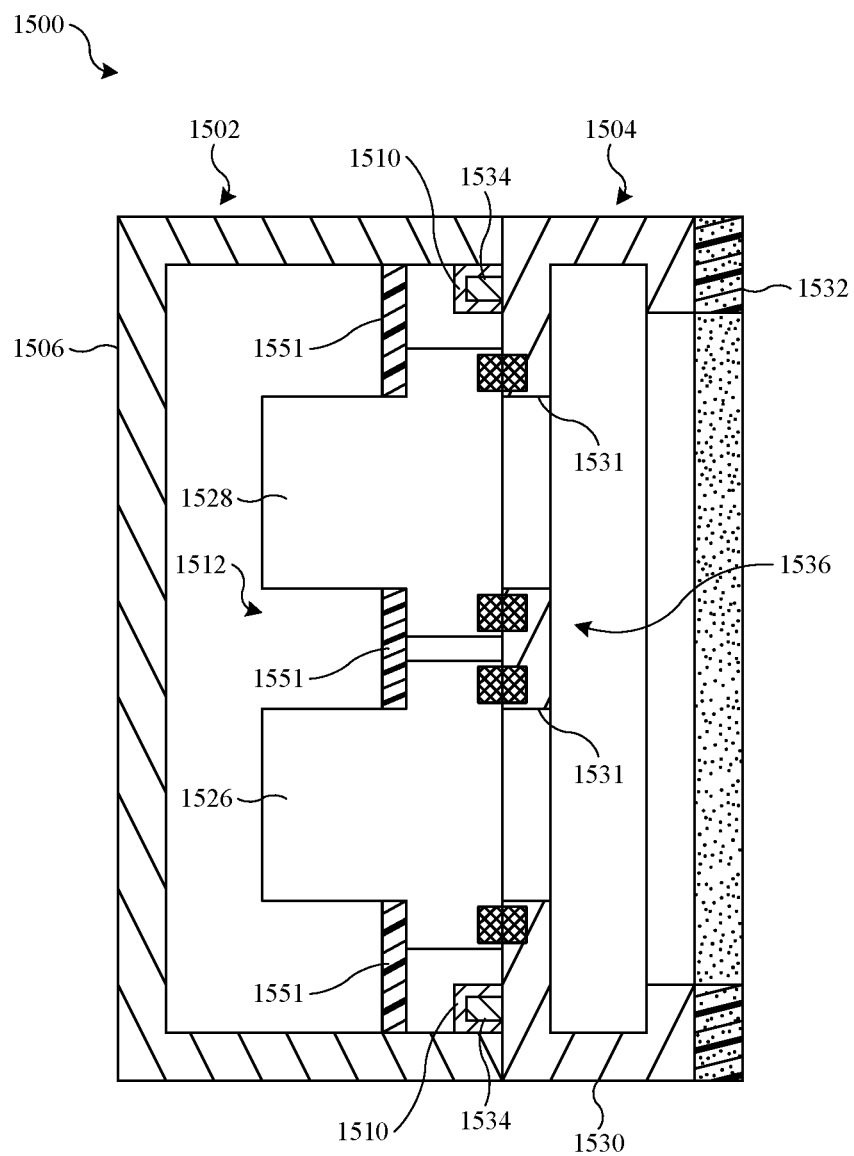
FIG. 16 is a top-down cross-section illustration that shows the seventh example of the head-mounted device with the first device portion and the second device portion of the head-mounted device shown in a connected position.

FIG. 15 is an illustration that shows a seventh example of a head-mounted device 1500 with a first device portion 1502 and a second device portion of the head-mounted device 1500 shown in a disconnected position. FIG. 16 is an illustration that shows the seventh example of the head-mounted device 1500 with the first device portion 1502 and the second device portion 1504 of the head-mounted device 1500 shown in a connected position.

The head-mounted device 1500 may be implemented in the manner described with respect to the head-mounted device 100 except as stated otherwise herein, and the description of the head-mounted device 100 and its components from FIGS. 1-2 is hereby incorporated by reference in the description of the head-mounted device 1500.

The first device portion 1502 of the head-mounted device 1500 includes a primary housing 1506, a first coupler portion 1510, a first adjuster portion 1512, a left optical module 1526, and a right optical module 1528. The second device portion 1504 of the head-mounted device 1500 includes a secondary housing 1530, a face cushion 1532, a second coupler portion 1534, and a second adjuster portion 1536. Openings 1531 are formed in the secondary housing 1530 to allow visibility of the left optical module 1526 and the right optical module 1528 when the head-mounted device 1500 is worn by a user. Other components may be included in the first device portion 1502 and the second device portion 1504 of the head-mounted device 1500, including components that were described with respect to the head-mounted device 100.

The first adjuster portion 1512 and the second adjuster portion 1536 cooperate to define an IPD adjustment assembly. The IPD adjustment assembly allows a distance between an optical axis of the left optical module 1526 and an optical axis of the right optical module 1528 to be adjusted between a minimum IPD and a maximum IPD.

In the illustrated example, the first adjuster portion 1512 is an assembly that includes an elastic support structure 1551. The elastic support structure 1551 is connected to the primary housing 1506 of the first device portion 1502 and is also connected to the left optical module 1526 and the right optical module 1528. The elastic support structure 1551 supports the left optical module 1526 and the right optical module 1528 in a neutral position relative to the primary housing 1506 of the first device portion 1502. The elastic support structure 1551 is able to deform relative to the neutral position in response to external forces (e.g., by stretching and contracting), which allows the left optical module 1526 and the right optical module 1528 to move laterally (side-to-side direction) to allow for IPD adjustment, to move longitudinally (front-to-back direction) for eye relief adjustment, and/or to move vertically (up and down direction). When the external forces are released, the elastic nature of the elastic support structure 1551 urges the left optical module 1526 and the right optical module 1528 back to the neutral position.

The elastic support structure 1551 is a single-piece or multi-piece structure that is formed by a flexible and elastic material. As examples, the elastic support structure 1551 may be formed from synthetic rubber, silicone, or any other suitable flexible and elastic material. In the illustrated implementation, the elastic support structure 1551 is a sheet of flexible and elastic material that has its outer periphery mounted to the primary housing 1506 of the first device portion 1502, and includes apertures through which the left optical module 1526 and the right optical module 1528 extend, and at which they are connected to the elastic support structure 1551. In another implementation, the elastic support structure 1551 includes multiple bands or cords that extends between the primary housing 1506 and each of the left optical module 1526 and the right optical module 1528.

The first adjuster portion 1512 of the first device portion 1502 also includes a first group of magnetic connector components 1553 (magnetic and/or ferromagnetic components) and a second group of magnetic connector components 1554 (magnetic and/or ferromagnetic components). The first group of magnetic connector components 1553 includes one or more magnetic connector components that are connected to the left optical module 1526. The second group of magnetic connector components 1554 includes one or more magnetic connector components that are connected to the right optical module 1528.

The second adjuster portion 1536 of the second device portion 1504 includes a first group of magnetic connector components 1555 (magnetic and/or ferromagnetic components) and a second group of magnetic connector components 1556 (magnetic and/or ferromagnetic components). The first group of magnetic connector components 1555 includes one or more magnetic connector components that are connected to the secondary housing 1530 of the second device portion 1504 and positioned around the opening 1531 in general correspondence to the position of the left optical module 1526 and the first group of magnetic connector components 1553 of the first adjuster portion 1512 of the first device portion 1502. The second group of magnetic connector components 1556 includes one or more magnetic connector components that are connected to the secondary housing 1530 of the second device portion 1504 and positioned around the opening 1531 in general correspondence to the position of the right optical module 1528 and the second group of magnetic connector components 1554 of the first adjuster portion 1512 of the first device portion 1502.

The first group of magnetic connector components 1555 and the second group of magnetic connector components 1556 of the second device portion 1504 are configured to shift the position of the left optical module 1526 and the right optical module 1528 by magnetic attraction with respect to the first group of magnetic connector components 1553 and the second group of magnetic connector components 1554 of the first adjuster portion 1512 during connection of the second device portion 1504 to the first device portion 1502. Thus, the left optical module 1526 and the right optical module 1528 are moved laterally, longitudinally, and/or vertically by expansion and contraction of the elastic support structure 1551 in dependence on an offset between the first group of magnetic connector components 1555 and the second group of magnetic connector components 1556 of the second device portion 1504 with respect to the first group of magnetic connector components 1553 and the second group of magnetic connector components 1554 of the first device portion 1502. Thus, connecting the second device portion 1504 to the first device portion 1502 shifts the position of the left optical module 1526 and the right optical module 1528 in dependence on the locations of the first group of magnetic connector components 1555 and the second first group of magnetic connector components 1556 to set the IPD based on the configuration of the second adjuster portion 1536 of the second device portion 1504.

The second device portion 1504 is connectable to and disconnectable from the first device portion 1502 by engagement and disengagement of the first coupler portion 1510 of the first device portion 1502 with the second coupler portion 1534 of the second device portion 1504. Connection and disconnection of the first coupler portion 1510 and the second coupler portion 1534 allows movement of the first device portion 1502 and the second device portion 1504 between the disconnected position (FIG. 15) and the connected position (FIG. 16). As previously described, the first coupler portion 1510 and the second coupler portion 1534 may be physical connection structures, magnetic connection structures, or other types of connection structures.

The second adjuster portion 1536 of the second device portion 1504 is configured to cause the left optical module 1526 and the right optical module 1528 of the first device portion to move to a specific lateral spacing with respect to each other in the connected position, which corresponds to a specific IPD that is therefore set by connection of the second device portion 1504 to the first device portion 1502. Several similarly configured second device portions may be made for use with the first device portion 1502, and each of the several similarly configured device portions may have a differently configured second adjuster portion (by a fixed configuration or adjustable configuration) that corresponds to a specific IPD. This allows each of several users to use the first device portion 1502 with their own user-specific instance of the second device portion 1504.

Figure 17:
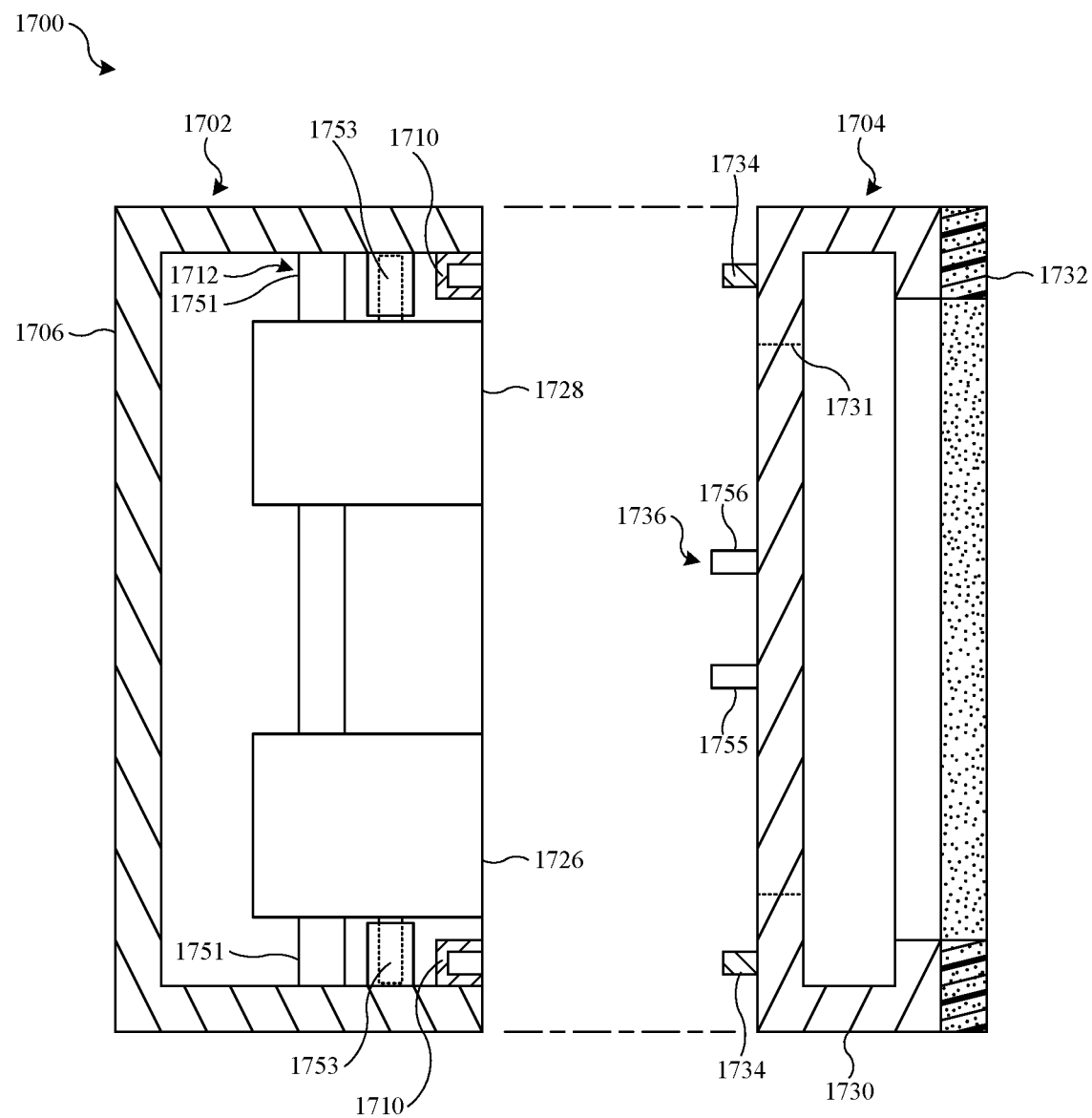
FIG. 17 is a top-down cross-section illustration that shows an eighth example of a head-mounted device with a first device portion and a second device portion of the head-mounted device shown in a disconnected position.
Figure 18:
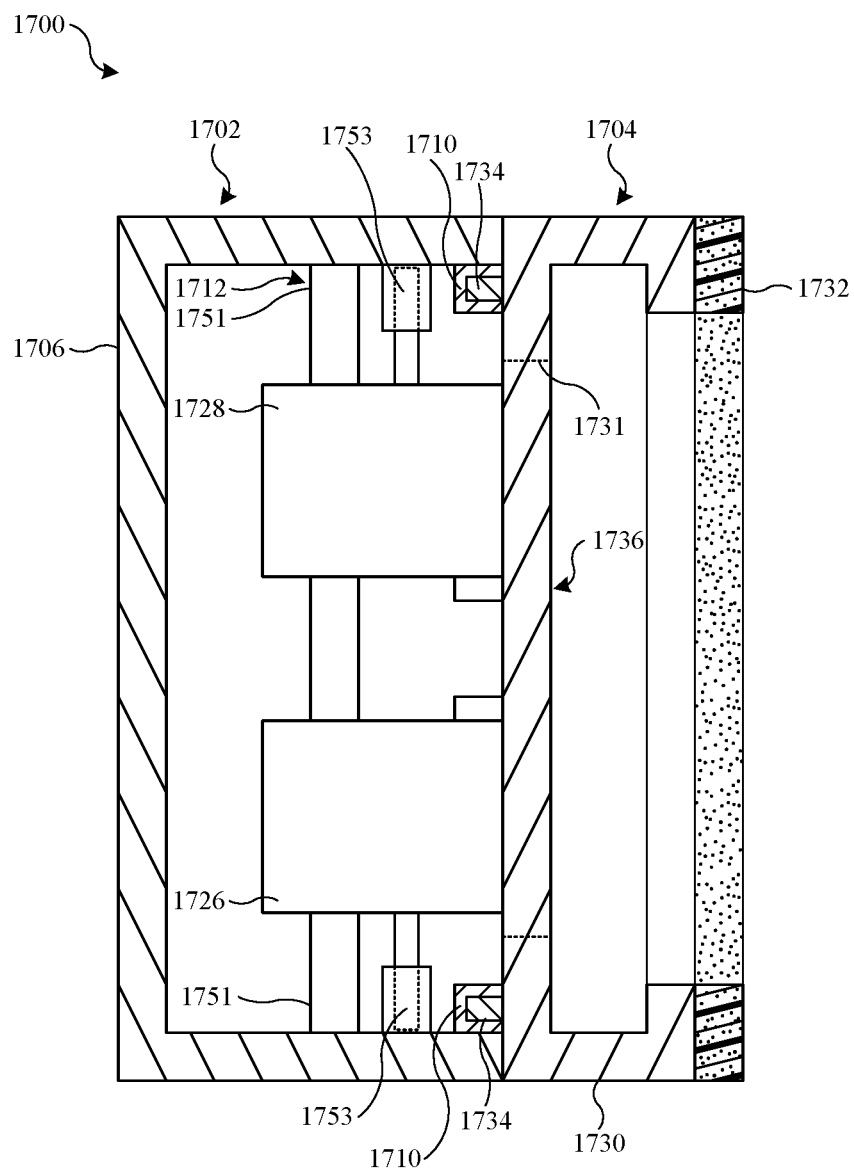
FIG. 18 is a top-down cross-section illustration that shows the eighth example of the head-mounted device with the first device portion and the second device portion of the head-mounted device shown in a connected position.

FIG. 17 is an illustration that shows an eighth example of a head-mounted device 1700 with a first device portion 1702 and a second device portion of the head-mounted device 1700 shown in a disconnected position. FIG. 18 is an illustration that shows the eighth example of the head-mounted device 1700 with the first device portion 1702 and the second device portion 1704 of the head-mounted device 1700 shown in a connected position.

The head-mounted device 1700 may be implemented in the manner described with respect to the head-mounted device 100 except as stated otherwise herein, and the description of the head-mounted device 100 and its components from FIGS. 1-2 is hereby incorporated by reference in the description of the head-mounted device 1700.

The first device portion 1702 of the head-mounted device 1700 includes a primary housing 1706, a first coupler portion 1710, a first adjuster portion 1712, a left optical module 1726, and a right optical module 1728. The second device portion 1704 of the head-mounted device 1700 includes a secondary housing 1730, a face cushion 1732, a second coupler portion 1734, and a second adjuster portion 1736. An opening 1731 is formed in the secondary housing 1730 to allow visibility of the left optical module 1726 and the right optical module 1728 when the head-mounted device 1700 is worn by a user. Other components may be included in the first device portion 1702 and the second device portion 1704 of the head-mounted device 1700, including components that were described with respect to the head-mounted device 100.

The first adjuster portion 1712 and the second adjuster portion 1736 cooperate to define an IPD adjustment assembly. The IPD adjustment assembly allows a distance between an optical axis of the left optical module 1726 and an optical axis of the right optical module 1728 to be adjusted between a minimum IPD and a maximum IPD.

In the illustrated example, the first adjuster portion 1712 is an assembly that includes a rail 1751 and pneumatic actuators 1753. The rail 1751 may be located in the primary housing 1706 and fixed with respect to the primary housing 1706. The left optical module 1726 and the right optical module 1728 are connected to the rail 1751 and supported with respect to the rail 1751 to allow lateral (side-to-side) sliding of the left optical module 1726 and the right optical module 1728 with respect to the rail 1751 and with respect to the primary housing 1706. The rail 1751 may be any structural element that allows the left optical module 1726 and the right optical module 1728 to be mounted to it in a manner that allows sliding. The rail 1751 may be a single structure or may include multiple structures. Sliding motion of the left optical module 1726 and the right optical module 1728 with respect to the rail includes sliding of the left optical module 1726 and the right optical module 1728 toward one another to decrease the IPD and sliding of the left optical module 1726 and the right optical module 1728 away from one another to increase the IPD.

The pneumatic actuators 1753 control movement of the left optical module 1726 and the right optical module 1728 on the rail 1751. As an example, the pneumatic actuators 1753 may be piston-cylinder actuators that are controlled to extend and retract using valves to supply pressurized air from an air source for extension and to release pressurized air for retraction. In the illustrated example, the pneumatic actuators 1753 include a first pneumatic actuator that is connected to the left optical module 1726 to move the left optical module 1726 along the rail 1751 and a second pneumatic actuator that is connected to the right optical module 1728 to move the right optical module 1728 along the rail 1751.

The second adjuster portion 1736 also includes a first stop surface 1755 and a second stop surface 1756. The first stop surface 1755 and the second stop surface 1756 are positioned (fixed or adjustably) on the secondary housing 1730 at locations that correspond to a desired IPD between the left optical module 1726 and the right optical module 1728. Upon connection of the second device portion 1704 to the first device portion 1702, the pneumatic actuators 1753 are operated to extend and move the left optical module 1726 and the right optical module 1728 laterally inward until the left optical module 1726 reaches and engages the first stop surface 1755 and the right optical module 1728 reaches and engages the second stop surface 1756. Engagement with the first stop surface 1755 and the second stop surface 1756 ceases inward movement of the left optical module 1726 and the right optical module 1728, thereby setting the IPD according to the locations of the first stop surface 1755 and the second stop surface 1756.

The second device portion 1704 is connectable to and disconnectable from the first device portion 1702 by engagement and disengagement of the first coupler portion 1710 of the first device portion 1702 with the second coupler portion 1734 of the second device portion 1704. Connection and disconnection of the first coupler portion 1710 and the second coupler portion 1734 allows movement of the first device portion 1702 and the second device portion 1704 between the disconnected position (FIG. 17) and the connected position (FIG. 18). As previously described, the first coupler portion 1710 and the second coupler portion 1734 may be physical connection structures, magnetic connection structures, or other types of connection structures.

The second adjuster portion 1736 of the second device portion 1704 is configured to cause the left optical module 1726 and the right optical module 1728 of the first device portion to move to a specific lateral spacing with respect to each other in the connected position, which corresponds to a specific IPD that is therefore set by connection of the second device portion 1704 to the first device portion 1702. Several similarly configured second device portions may be made for use with the first device portion 1702, and each of the several similarly configured device portions may have a differently configured second adjuster portion (by a fixed configuration or adjustable configuration) that corresponds to a specific IPD. This allows each of several users to use the first device portion 1702 with their own user-specific instance of the second device portion 1704.

Figure 19:
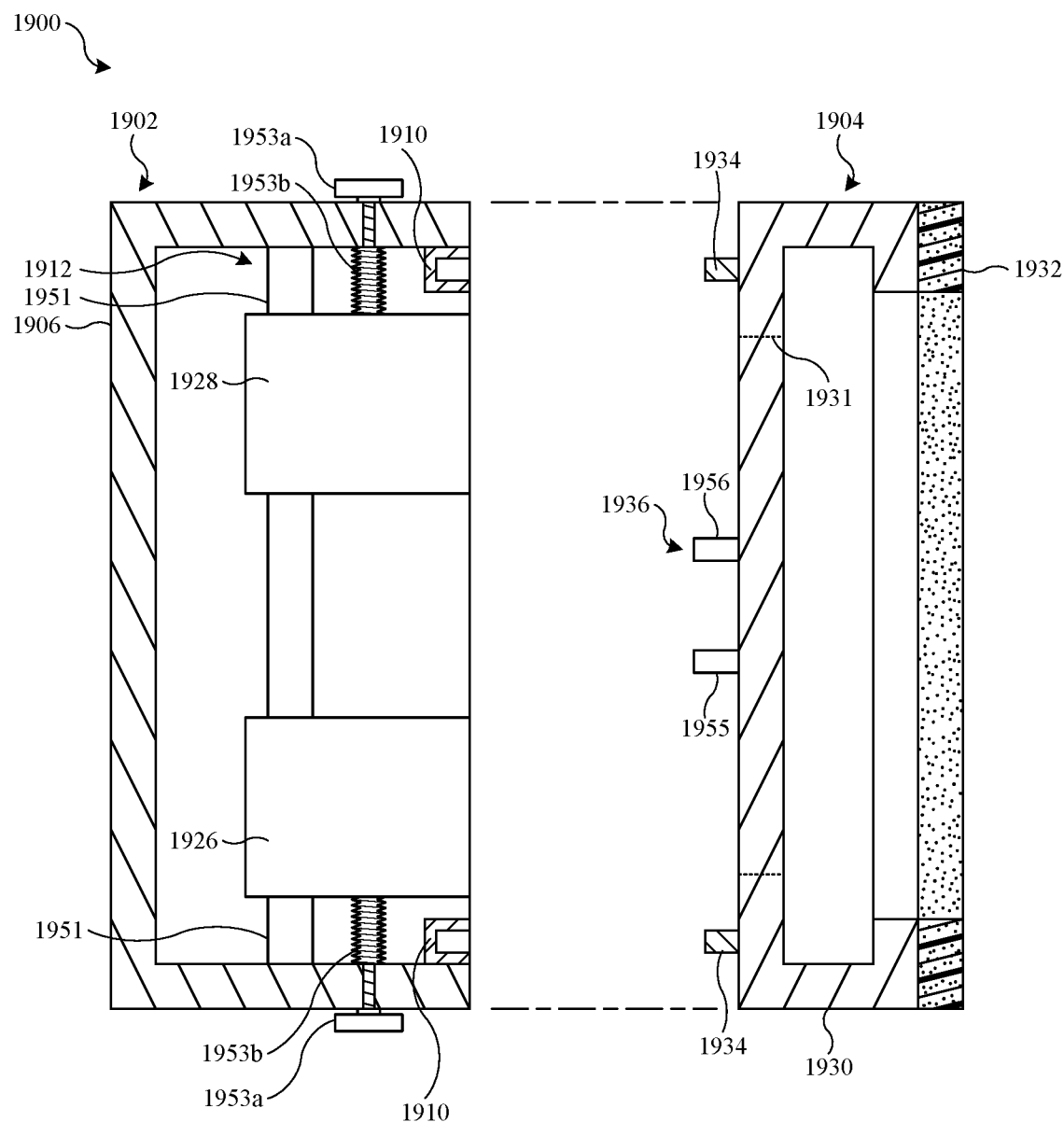
FIG. 19 is a top-down cross-section illustration that shows a ninth example of a head-mounted device with a first device portion and a second device portion of the head-mounted device shown in a disconnected position.
Figure 20:
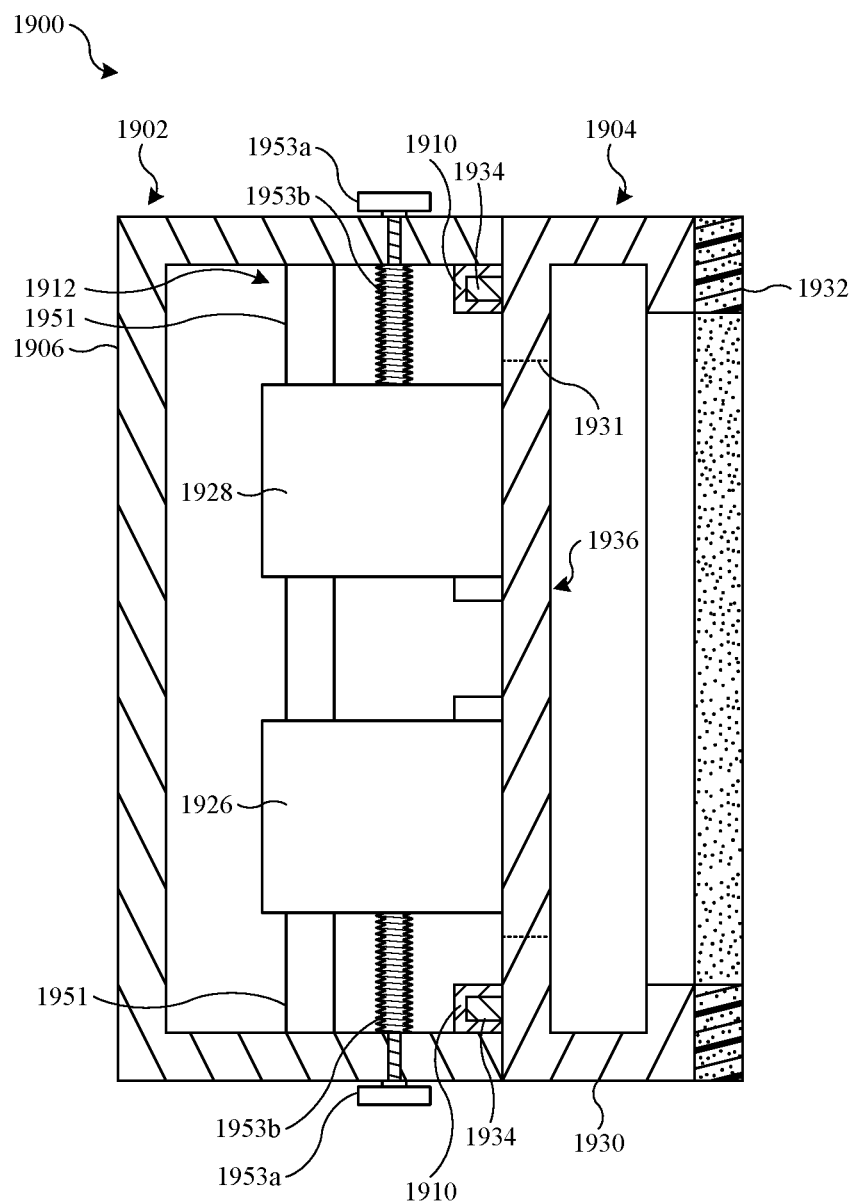
FIG. 20 is a top-down cross-section illustration that shows the ninth example of the head-mounted device with the first device portion and the second device portion of the head-mounted device shown in a connected position.

FIG. 19 is an illustration that shows a ninth example of a head-mounted device 1900 with a first device portion 1902 and a second device portion of the head-mounted device 1900 shown in a disconnected position. FIG. 20 is an illustration that shows the ninth example of the head-mounted device 1900 with the first device portion 1902 and the second device portion 1904 of the head-mounted device 1900 shown in a connected position.

The head-mounted device 1900 may be implemented in the manner described with respect to the head-mounted device 100 except as stated otherwise herein, and the description of the head-mounted device 100 and its components from FIGS. 1-2 is hereby incorporated by reference in the description of the head-mounted device 1900.

The first device portion 1902 of the head-mounted device 1900 includes a primary housing 1906, a first coupler portion 1910, a first adjuster portion 1912, a left optical module 1926, and a right optical module 1928. The second device portion 1904 of the head-mounted device 1900 includes a secondary housing 1930, a face cushion 1932, a second coupler portion 1934, and a second adjuster portion 1936. An opening 1931 is formed in the secondary housing 1930 to allow visibility of the left optical module 1926 and the right optical module 1928 when the head-mounted device 1900 is worn by a user. Other components may be included in the first device portion 1902 and the second device portion 1904 of the head-mounted device 1900, including components that were described with respect to the head-mounted device 100.

The first adjuster portion 1912 and the second adjuster portion 1936 cooperate to define an IPD adjustment assembly. The IPD adjustment assembly allows a distance between an optical axis of the left optical module 1926 and an optical axis of the right optical module 1928 to be adjusted between a minimum IPD and a maximum IPD.

The first adjuster portion 1912 allows manual adjustment of the position of the left optical module 1926 and the right optical module 1928. In the illustrated example, the first adjuster portion 1912 is an assembly that includes a rail 1951 and adjuster knobs 1953a that turn lead screws 1953b. The rail 1951 may be located in the primary housing 1906 and fixed with respect to the primary housing 1906. The left optical module 1926 and the right optical module 1928 are connected to the rail 1951 and supported with respect to the rail 1951 to allow lateral (side-to-side) sliding of the left optical module 1926 and the right optical module 1928 with respect to the rail 1951 and with respect to the primary housing 1906. The rail 1951 may be any structural element that allows the left optical module 1926 and the right optical module 1928 to be mounted to it in a manner that allows sliding. The rail 1951 may be a single structure or may include multiple structures. Sliding motion of the left optical module 1926 and the right optical module 1928 with respect to the rail includes sliding of the left optical module 1926 and the right optical module 1928 toward one another to decrease the IPD and sliding of the left optical module 1926 and the right optical module 1928 away from one another to increase the IPD.

The adjuster knobs 1953a and the lead screws 1953b control movement of the left optical module 1926 and the right optical module 1928 on the rail 1951. One of the adjuster knobs 1953a and a corresponding one of the lead screws 1953b is connected to the left optical module 1926 to move the left optical module 1926 laterally when the corresponding one of the adjuster knobs 1953a is turned by the user. One of the adjuster knobs 1953a and a corresponding one of the lead screws 1953b is connected to the right optical module 1928 to move the right optical module 1928 laterally when the corresponding one of the adjuster knobs 1953a is turned by the user. The adjuster knobs 1953a may include clutches that slip in response to a predetermined amount of resistance (e.g., applied torque exceeds a maximum torque value) to stop motion when motion is resisted (e.g., by a stop surface).

The second adjuster portion 1936 also includes a first stop surface 1955 and a second stop surface 1956. The first stop surface 1955 and the second stop surface 1956 are positioned (fixed or adjustably) on the secondary housing 1930 at locations that correspond to a desired IPD between the left optical module 1926 and the right optical module 1928. Upon connection of the second device portion 1904 to the first device portion 1902, the adjuster knobs 1953a are operated to move the left optical module 1926 and the right optical module 1928 laterally inward until the left optical module 1926 reaches and engages the first stop surface 1955 and the right optical module 1928 reaches and engages the second stop surface 1956. Engagement with the first stop surface 1955 and the second stop surface 1956 ceases inward movement of the left optical module 1926 and the right optical module 1928 (e.g., by slipping of clutches included in the adjuster knobs 1953a), thereby setting the IPD according to the locations of the first stop surface 1955 and the second stop surface 1956.

The second device portion 1904 is connectable to and disconnectable from the first device portion 1902 by engagement and disengagement of the first coupler portion 1910 of the first device portion 1902 with the second coupler portion 1934 of the second device portion 1904. Connection and disconnection of the first coupler portion 1910 and the second coupler portion 1934 allows movement of the first device portion 1902 and the second device portion 1904 between the disconnected position (FIG. 19) and the connected position (FIG. 20). As previously described, the first coupler portion 1910 and the second coupler portion 1934 may be physical connection structures, magnetic connection structures, or other types of connection structures.

The second adjuster portion 1936 of the second device portion 1904 is configured to cause the left optical module 1926 and the right optical module 1928 of the first device portion to move to a specific lateral spacing with respect to each other in the connected position, which corresponds to a specific IPD that is therefore set by connection of the second device portion 1904 to the first device portion 1902. Several similarly configured second device portions may be made for use with the first device portion 1902, and each of the several similarly configured device portions may have a differently configured second adjuster portion (by a fixed configuration or adjustable configuration) that corresponds to a specific IPD. This allows each of several users to use the first device portion 1902 with their own user-specific instance of the second device portion 1904.

Figure 21:
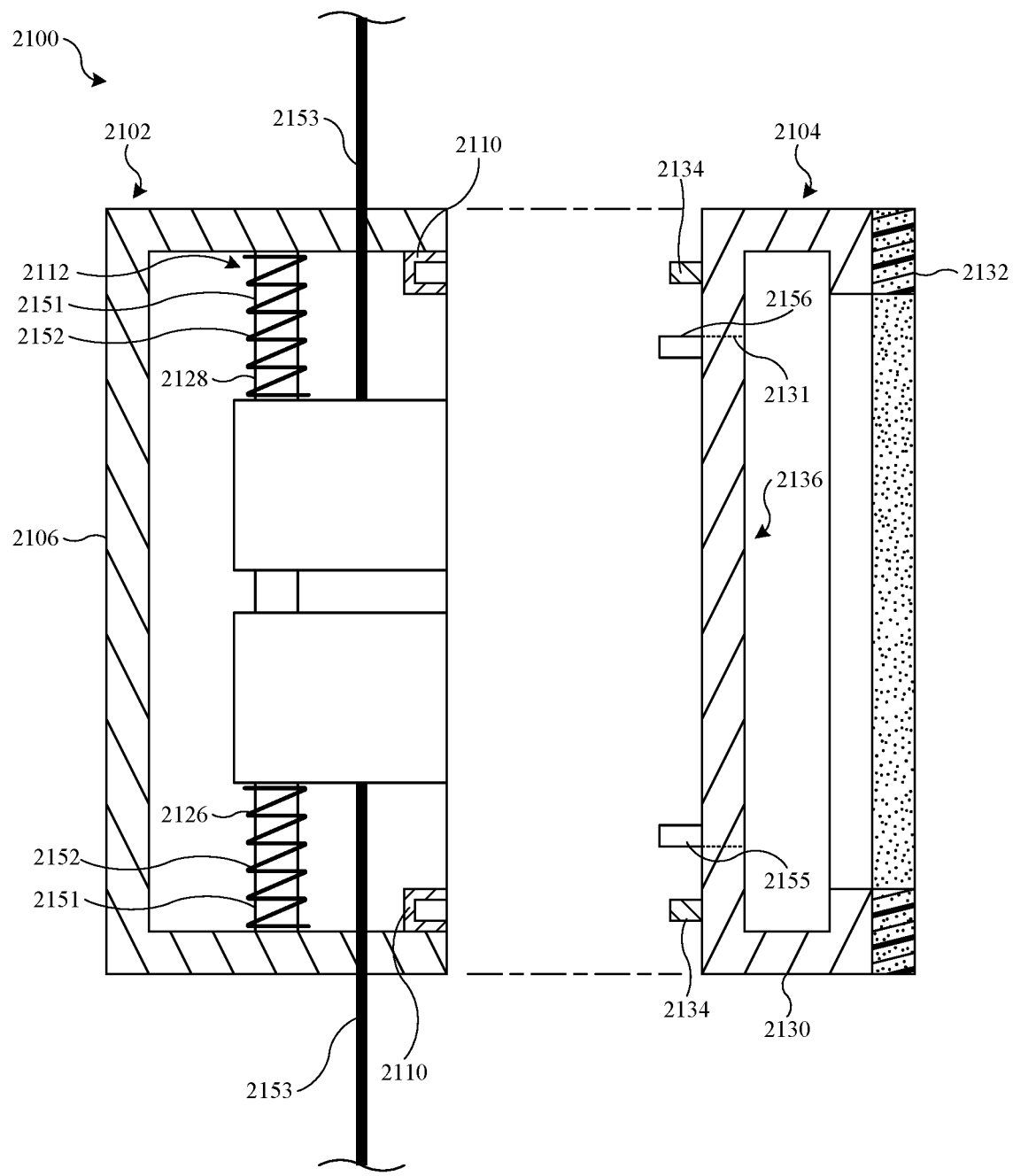
FIG. 21 is a top-down cross-section illustration that shows a tenth example of a head-mounted device with a first device portion and a second device portion of the head-mounted device shown in a disconnected position.
Figure 22:
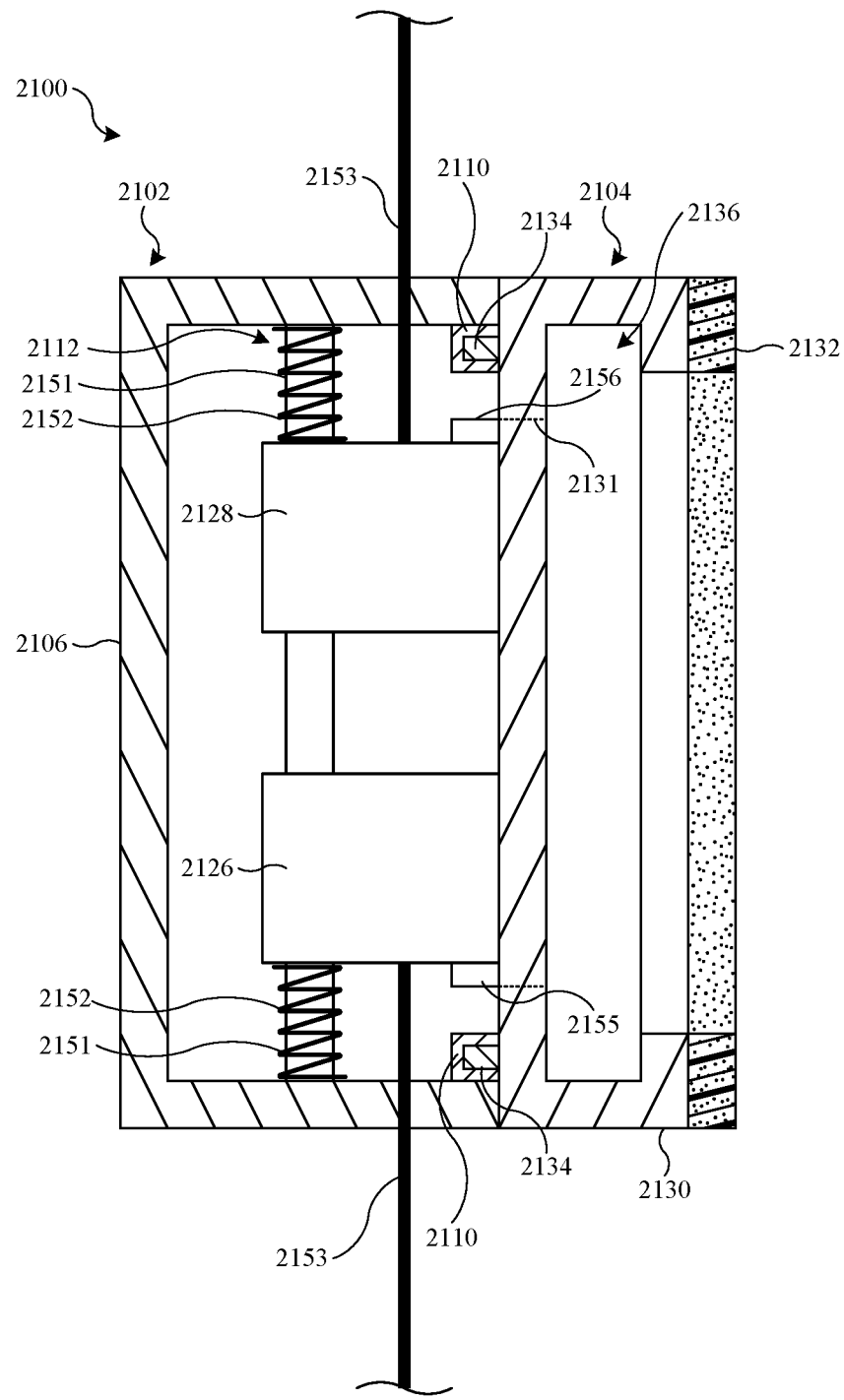
FIG. 22 is a top-down cross-section illustration that shows the tenth example of the head-mounted device with the first device portion and the second device portion of the head-mounted device shown in a connected position.

FIG. 21 is an illustration that shows a tenth example of a head-mounted device 2100 with a first device portion 2102 and a second device portion of the head-mounted device 2100 shown in a disconnected position. FIG. 22 is an illustration that shows the tenth example of the head-mounted device 2100 with the first device portion 2102 and the second device portion 2104 of the head-mounted device 2100 shown in a connected position.

The head-mounted device 2100 may be implemented in the manner described with respect to the head-mounted device 100 except as stated otherwise herein, and the description of the head-mounted device 100 and its components from FIGS. 1-2 is hereby incorporated by reference in the description of the head-mounted device 2100.

The first device portion 2102 of the head-mounted device 2100 includes a primary housing 2106, a first coupler portion 2110, a first adjuster portion 2112, a left optical module 2126, and a right optical module 2128. The second device portion 2104 of the head-mounted device 2100 includes a secondary housing 2130, a face cushion 2132, a second coupler portion 2134, and a second adjuster portion 2136. An opening 2131 is formed in the secondary housing 2130 to allow visibility of the left optical module 2126 and the right optical module 2128 when the head-mounted device 2100 is worn by a user. Other components may be included in the first device portion 2102 and the second device portion 2104 of the head-mounted device 2100, including components that were described with respect to the head-mounted device 100.

The first adjuster portion 2112 and the second adjuster portion 2136 cooperate to define an IPD adjustment assembly. The IPD adjustment assembly allows a distance between an optical axis of the left optical module 2126 and an optical axis of the right optical module 2128 to be adjusted between a minimum IPD and a maximum IPD.

In the illustrated example, the first adjuster portion 2112 is an assembly that includes a rail 2151, springs 2152, and flexible connectors 2153. The rail 2151 may be located in the primary housing 2106 and fixed with respect to the primary housing 2106. The left optical module 2126 and the right optical module 2128 are connected to the rail 2151 and supported with respect to the rail 2151 to allow lateral (side-to-side) sliding of the left optical module 2126 and the right optical module 2128 with respect to the rail 2151 and with respect to the primary housing 2106. The rail 2151 may be any structural element that allows the left optical module 2126 and the right optical module 2128 to be mounted to it in a manner that allows sliding. The rail 2151 may be a single structure or may include multiple structures. Sliding motion of the left optical module 2126 and the right optical module 2128 with respect to the rail includes sliding of the left optical module 2126 and the right optical module 2128 toward one another to decrease the IPD and sliding of the left optical module 2126 and the right optical module 2128 away from one another to increase the IPD.

The springs 2152 define an initial position for the left optical module 2126 and the right optical module 2128 in the disconnected position. The springs 2152 are located laterally outward from each of the left optical module 2126 and the right optically module 2128 to urge the left optical module 2126 and the right optical module 2128 laterally inward and to resist laterally outward movement of the left optical module 2126 and the right optical module 2128. In the illustrated example, the springs 2152 are compression springs, but different numbers of springs and/or types of springs may be used instead to similar effect.

The flexible connectors 2153 are flexible elements that are each connected to one of the left optical module 2126 and the right optical module 2128, and are also connected to or are part of the support structure that secures the head-mounted device 2100 to the user's head. As an example, the flexible connectors 2153 may be, or may be connected to, end portions of a headband that supports the head-mounted device 2100. When the user wears the head-mounted device 2100, the support structure is extended and applies tension to the flexible connectors 2153, which causes the left optical module 2126 and the right optical module 2128 to move laterally outward in opposition to the forces applied by the springs 2152.

In the illustrated example, the flexible connectors 2153 are shown as part of the first device portion 2102, by extending into to the primary housing 2106 of the first device portion 2102 and being directly connected to the left optical module 2126 and the right optical module 2128. In an alternative implementation, the flexible connectors 2153 (and thus the support structure that secures the head-mounted device 2100 to the user's head) could be part of the second device portion 2104, in which case the flexible connectors 2153 would be indirectly connected to the left optical module 2126 and the right optical module 2128 by components located in the second device portion 2104.

The second adjuster portion 2136 also includes a first stop surface 2155 and a second stop surface 2156. The first stop surface 2155 and the second stop surface 2156 are positioned (fixed or adjustably) on the secondary housing 2130 at locations that correspond to a desired IPD between the left optical module 2126 and the right optical module 2128. The first stop surface 2155 and the second stop surface 2156 are located laterally outward from the left optical module 2126 and the right optical module 2128 when no tension is applied to the flexible connectors 2153. When tension is applied to the flexible connectors 2153, the left optical module 2126 and the right optical module 2128 move laterally outward until the left optical module 2126 reaches and engages the first stop surface 2155 and the right optical module 2128 reaches and engages the second stop surface 2156. Engagement with the first stop surface 2155 and the second stop surface 2156 ceases outward movement of the left optical module 2126 and the right optical module 2128.

The second device portion 2104 is connectable to and disconnectable from the first device portion 2102 by engagement and disengagement of the first coupler portion 2110 of the first device portion 2102 with the second coupler portion 2134 of the second device portion 2104. Connection and disconnection of the first coupler portion 2110 and the second coupler portion 2134 allows movement of the first device portion 2102 and the second device portion 2104 between the disconnected position (FIG. 21) and the connected position (FIG. 22). As previously described, the first coupler portion 2110 and the second coupler portion 2134 may be physical connection structures, magnetic connection structures, or other types of connection structures.

The second adjuster portion 2136 of the second device portion 2104 is configured to cause the left optical module 2126 and the right optical module 2128 of the first device portion to move to a specific lateral spacing with respect to each other in the connected position, which corresponds to a specific IPD that is therefore set by connection of the second device portion 2104 to the first device portion 2102. Several similarly configured second device portions may be made for use with the first device portion 2102, and each of the several similarly configured device portions may have a differently configured second adjuster portion (by a fixed configuration or adjustable configuration) that corresponds to a specific IPD. This allows each of several users to use the first device portion 2102 with their own user-specific instance of the second device portion 2104.

Figure 23:
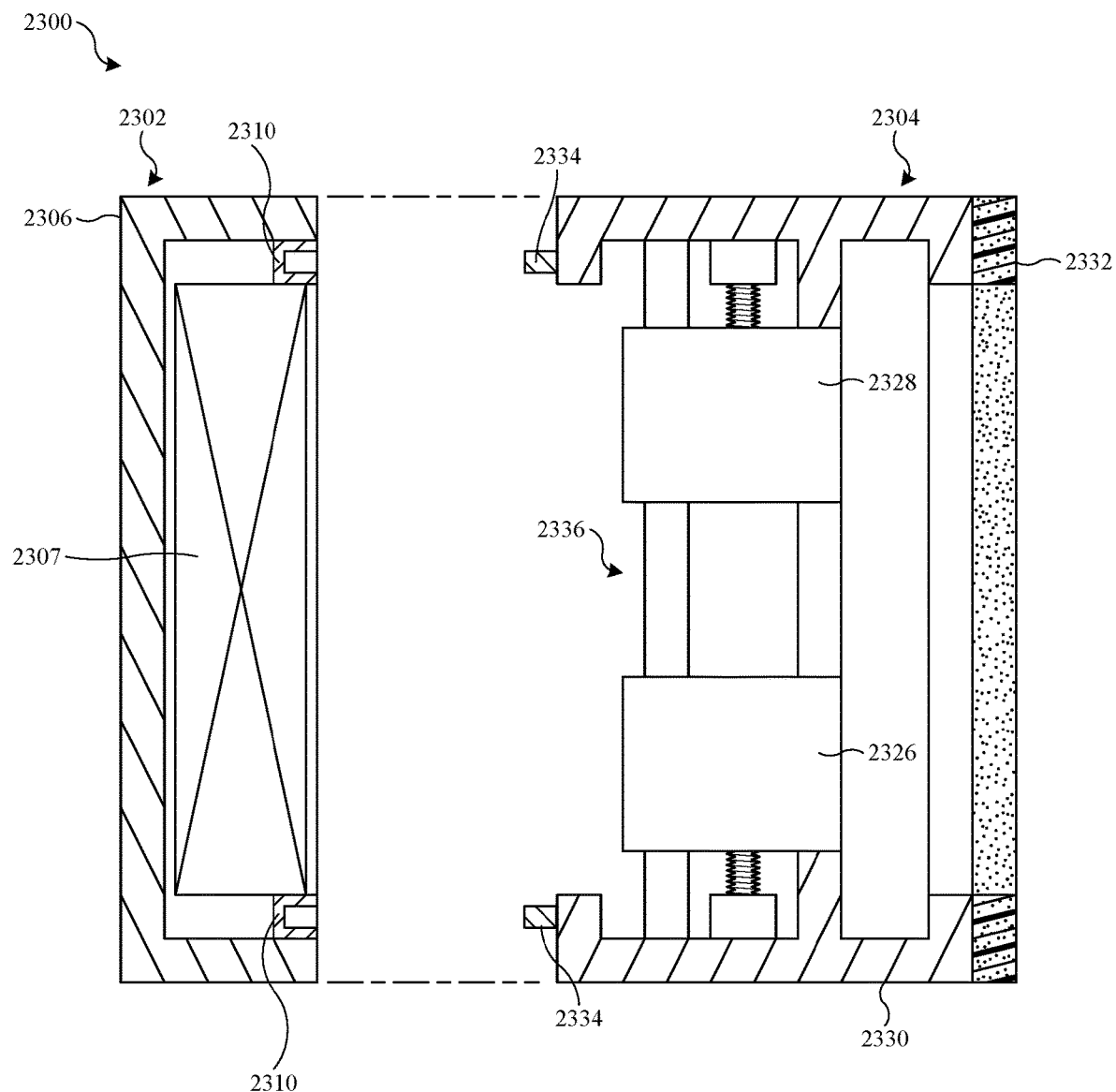
FIG. 23 is a top-down cross-section illustration that shows an eleventh example of a head-mounted device with a first device portion and a second device portion of the head-mounted device shown in a disconnected position.
Figure 24:
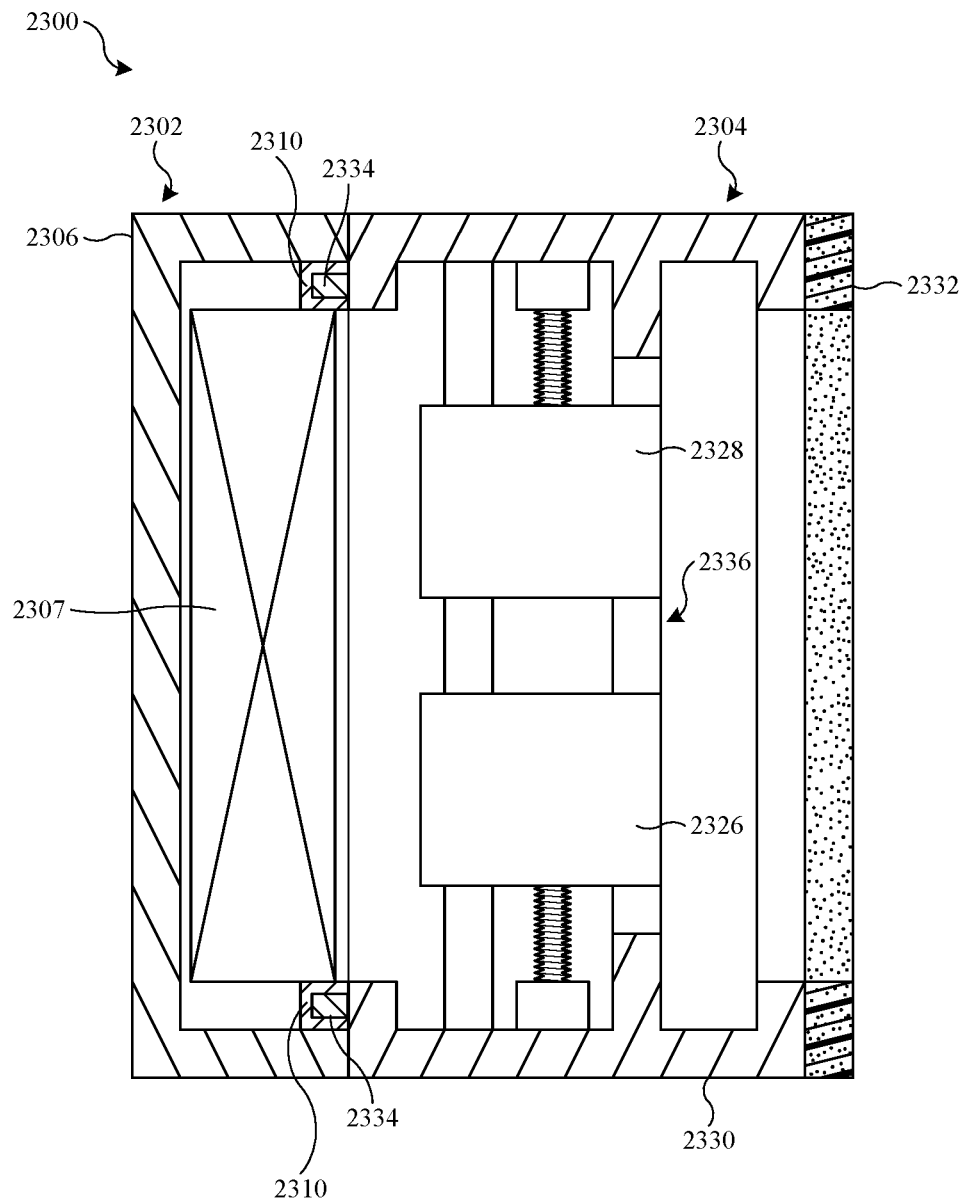
FIG. 24 is a top-down cross-section illustration that shows the eleventh example of the head-mounted device with the first device portion and the second device portion of the head-mounted device shown in a connected position.

FIG. 23 is an illustration that shows an eleventh example of a head-mounted device 2300 with a first device portion 2302 and a second device portion of the head-mounted device 2300 shown in a disconnected position. FIG. 24 is an illustration that shows the eleventh example of the head-mounted device 2300 with the first device portion 2302 and the second device portion 2304 of the head-mounted device 2300 shown in a connected position.

The head-mounted device 2300 may be implemented in the manner described with respect to the head-mounted device 100 except as stated otherwise herein, and the description of the head-mounted device 100 and its components from FIGS. 1-2 is hereby incorporated by reference in the description of the head-mounted device 2300.

The first device portion 2302 of the head-mounted device 2300 includes a primary housing 2306, electronic components 2307, and a first coupler portion 2310. The second device portion 2304 of the head-mounted device 2300 includes a left optical module 2326, a right optical module 2328, a secondary housing 2330, a face cushion 2332, a second coupler portion 2334, and an IPD adjustment assembly 2336. Other components may be included in the first device portion 2302 and the second device portion 2304 of the head-mounted device 2300, including components that were described with respect to the head-mounted device 100.

The electronic components 2307 may include components described with respect to the first device portion 102 of the head-mounted device 100. As an example, the electronic components may include components equivalent to the processor 114, the memory 116, the storage device 118, the communications device 120, the sensors 122, and/or the power source 124 of the first device portion 102 of the head-mounted device 100. When the first device portion 2302 is connected to the second device portion 2304 some or all of these components are electrically connected, by a wired connection or a wireless connection, to the left optical module 2326 and the right optical module 2328 to cause display of content.

The IPD adjustment assembly 2336 allows a distance between an optical axis of the left optical module 2326 and an optical axis of the right optical module 2328 to be adjusted between a minimum IPD and a maximum IPD. The IPD adjustment assembly is located in the secondary housing 2330 of the second device portion 2304 and adjustment is not dependent on connection of the second device portion 2304 to the first device portion 2302.

The IPD adjustment assembly 2336 includes mechanical or electrical adjustment components that move the left optical module 2326 and the right optical module 2328 to change the lateral spacing between them. In the illustrated example, the IPD adjustment assembly 2336 includes rails that support the optical modules, and lead screws that cause motion of the optical modules when rotated by electric motors. Other configurations can be used.

The second device portion 2304 is connectable to and disconnectable from the first device portion 2302 by engagement and disengagement of the first coupler portion 2310 of the first device portion 2302 with the second coupler portion 2334 of the second device portion 2304. Connection and disconnection of the first coupler portion 2310 and the second coupler portion 2334 allows movement of the first device portion 2302 and the second device portion 2304 between the disconnected position (FIG. 23) and the connected position (FIG. 24). As previously described, the first coupler portion 2310 and the second coupler portion 2334 may be physical connection structures, magnetic connection structures, or other types of connection structures.

Figure 25:
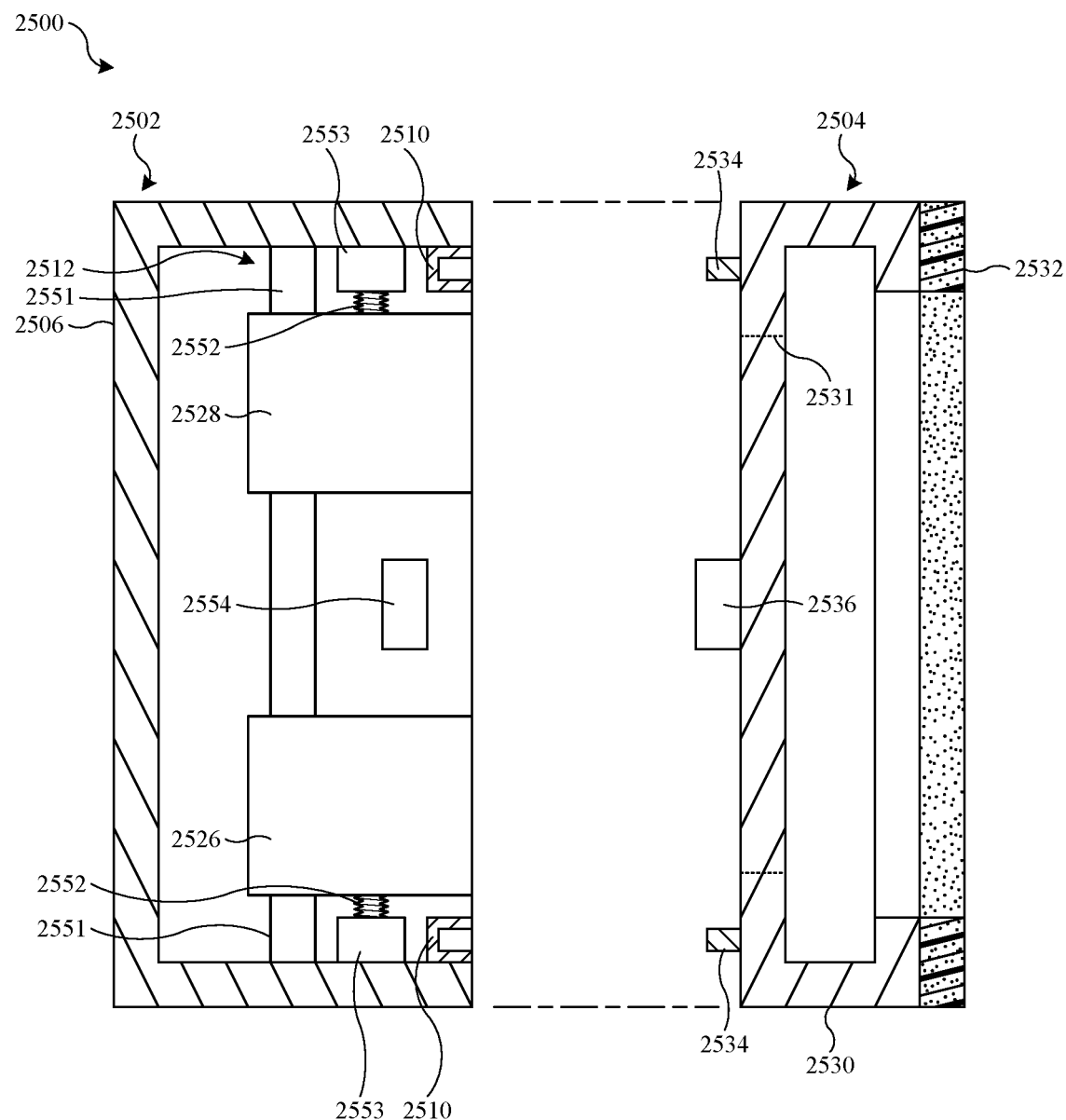
FIG. 25 is a top-down cross-section illustration that shows an eleventh example of a head-mounted device with a first device portion and a second device portion of the head-mounted device shown in a disconnected position.
Figure 26:
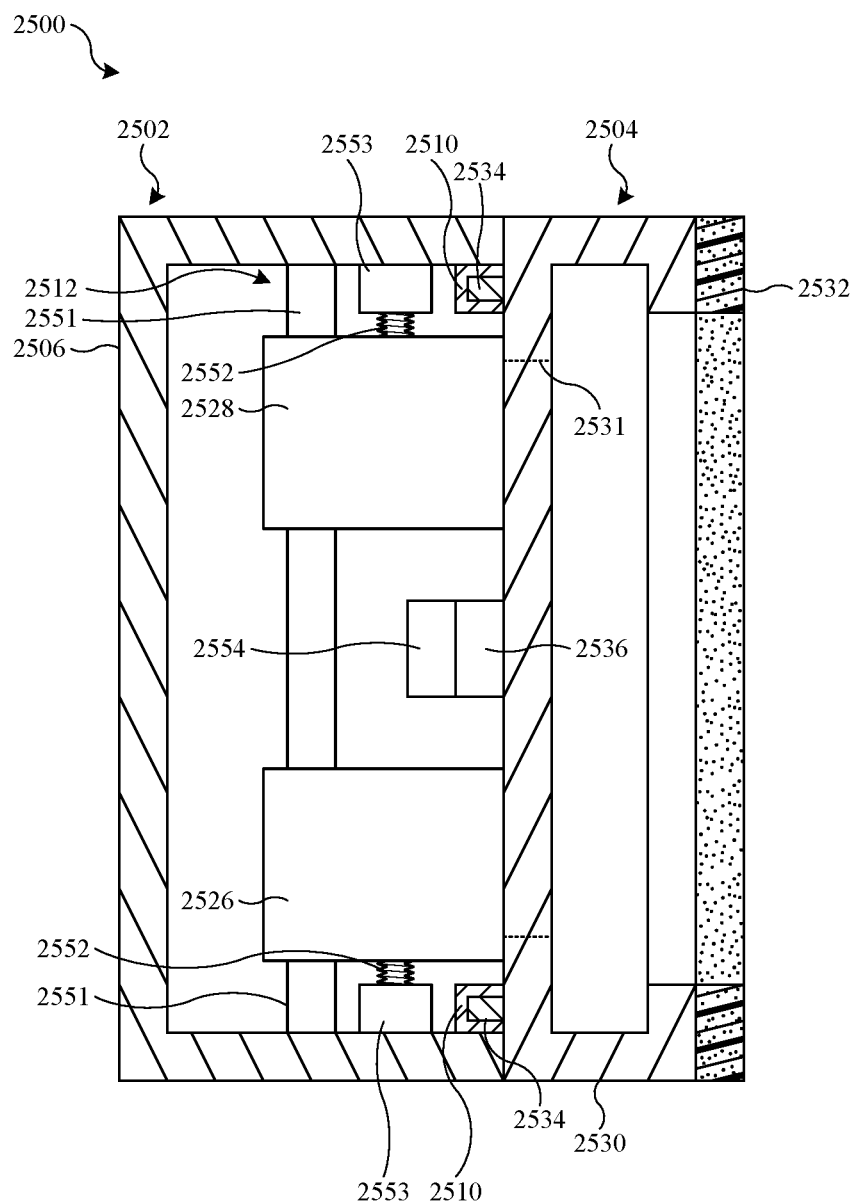
FIG. 26 is a top-down cross-section illustration that shows the eleventh example of the head-mounted device with the first device portion and the second device portion of the head-mounted device shown in a connected position.

FIG. 25 is an illustration that shows an eleventh example of a head-mounted device 2500 with a first device portion 2502 and a second device portion of the head-mounted device 2500 shown in a disconnected position. FIG. 26 is an illustration that shows the eleventh example of the head-mounted device 2500 with the first device portion 2502 and the second device portion 2504 of the head-mounted device 2500 shown in a connected position.

The head-mounted device 2500 may be implemented in the manner described with respect to the head-mounted device 100 except as stated otherwise herein, and the description of the head-mounted device 100 and its components from FIGS. 1-2 is hereby incorporated by reference in the description of the head-mounted device 2500.

The first device portion 2502 of the head-mounted device 2500 includes a primary housing 2506, a first coupler portion 2510, an IPD adjustment assembly 2512, a left optical module 2526, and a right optical module 2528. The second device portion 2504 of the head-mounted device 2500 includes a secondary housing 2530, a face cushion 2532, a second coupler portion 2534, and an adjustment indicator 2536. An opening 2531 is formed in the secondary housing 2530 to allow visibility of the left optical module 2526 and the right optical module 2528 when the head-mounted device 2500 is worn by a user. Other components may be included in the first device portion 2502 and the second device portion 2504 of the head-mounted device 2500, including components that were described with respect to the head-mounted device 100.

The IPD adjustment assembly 2512 allows a distance between an optical axis of the left optical module 2526 and an optical axis of the right optical module 2528 to be adjusted between a minimum IPD and a maximum IPD. The IPD adjustment assembly 2512 is located in the primary housing 2506 of the first device portion 2502. Adjustment is not dependent on mechanical interaction during connection of the second device portion 2504 to the first device portion 2502. Instead, the IPD adjustment assembly 2512 determines positions for the left optical module 2526 and the right optical module 2528 based on information provided by the adjustment indicator 2536 that is included in the second device portion 2504, as will be explained.

The IPD adjustment assembly 2512 includes electrical adjustment components that move the left optical module 2526 and the right optical module 2528 to change the lateral spacing between them. In the illustrated example, the IPD adjustment assembly 2512 includes a rail 2551 that supports the left optical module 2526 and the right optical module 2528, and lead screws 2552 that cause motion of the left optical module 2526 and the right optical module 2528 when rotated by electric motors 2553. Other configurations can be used.

The IPD adjustment assembly 2512 also includes an adjustment controller 2554 that controls operation of the electric motors 2553 or other prime mover that drives adjustment of the IPD setting. The IPD adjustment controller may be a computing device or other control device that receives information describing an IPD setting from the adjustment indicator 2536 of the second device portion 2504 and causes movement of the left optical module 2526 and the right optical module 2528 in accordance with the information in response to connection of the second device portion 2504 to the first device portion 2502.

In one implementation, the adjustment indicator 2536 includes an information storage device and transmits information to the adjustment controller 2554 using wireless communication, for example, in accordance with radio-frequency identification techniques and standards, near field communication techniques and standards, or any other suitable wireless data transmission techniques and standards. In one implementation, the adjustment indicator 2536 includes indicia that are readable by the adjustment controller 2554, such as by obtaining images of visible markings (e.g., a bar code or QR code) that are included in the adjustment indicator, or by obtaining images or otherwise perceiving non-visible markings, such as infrared indicators that are included in the adjustment indicator 2536. Other techniques can be used.

The second device portion 2504 is connectable to and disconnectable from the first device portion 2502 by engagement and disengagement of the first coupler portion 2510 of the first device portion 2502 with the second coupler portion 2534 of the second device portion 2504. Connection and disconnection of the first coupler portion 2510 and the second coupler portion 2534 allows movement of the first device portion 2502 and the second device portion 2504 between the disconnected position (FIG. 25) and the connected position (FIG. 26). As previously described, the first coupler portion 2510 and the second coupler portion 2534 may be physical connection structures, magnetic connection structures, or other types of connection structures.

When the second device portion 2504 is connected to the first device portion 2502, the adjustment controller 2554 determines the correct settings for IPD adjustment and/or other adjustments using information obtained from the adjustment indicator 2536. The adjustment controller 2554 then controls movement of the left optical module 2526 and the right optical module 2528 according to the obtained information.

Figure 27:
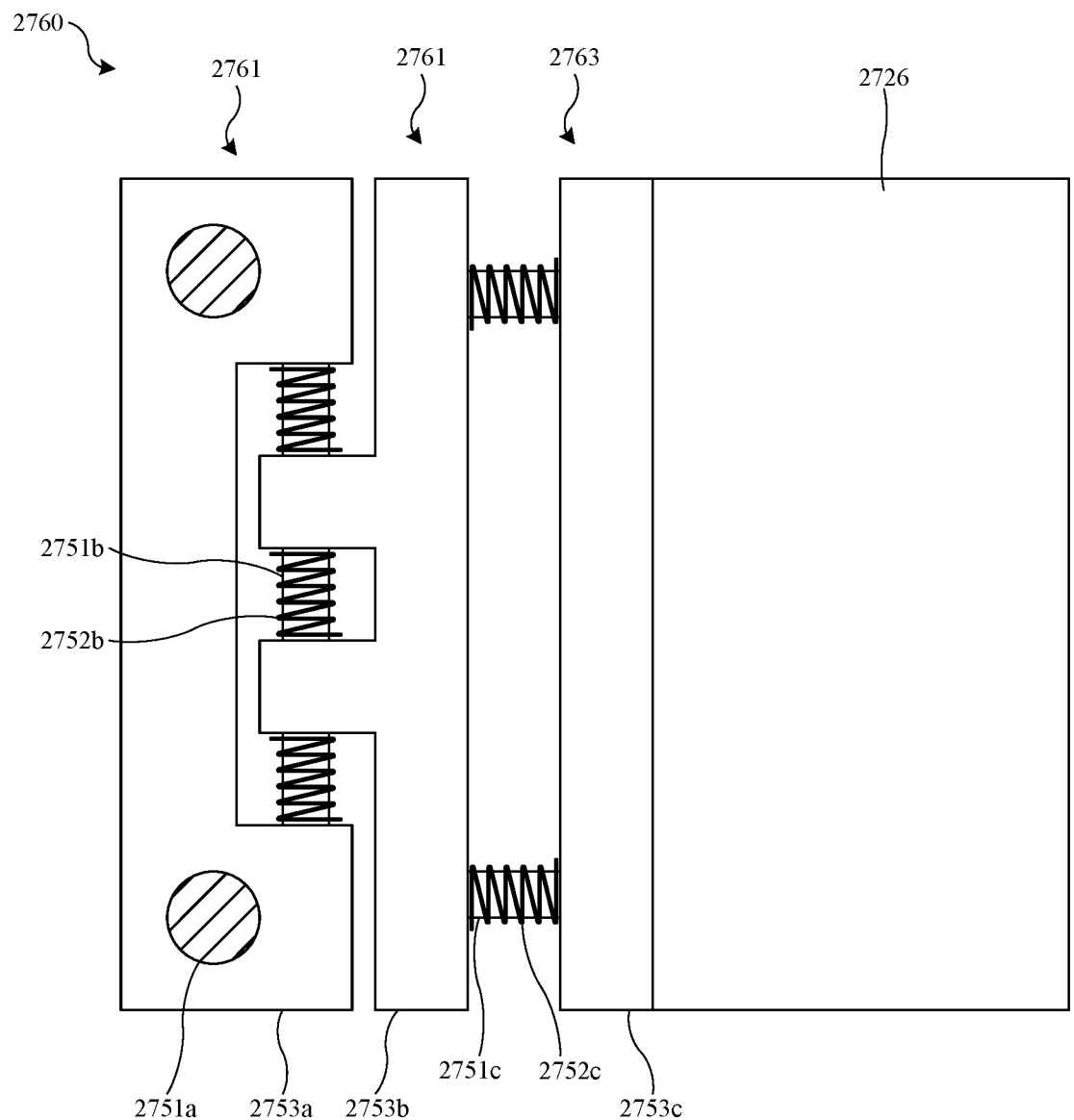
FIG. 27 is a side view illustration that shows an adjustment assembly for IPD adjustment, vertical adjustment, and eye relief adjustment.

FIG. 27 is a side view assembly that shows an adjuster assembly 2760 that is configured to adjust the position of an optical module 2726 for IPD adjustment, vertical adjustment, and eye relief adjustment. The adjuster assembly 2760 may be included in any of the head-mounted devices described with respect to FIGS. 1-26, for example as a part of the first device portion of those devices, and used in connection with the left and right optical modules of those devices.

The adjuster assembly 2760 includes a first adjustment stage 2761, a second adjustment stage 2762, and a third adjustment stage 2763. Movement of the optical module 2726 may be performed using mechanical or electrical adjusters as described elsewhere herein.

The first adjustment stage 2761 is an IPD adjustment stage that allows the optical module 2726 to move laterally. In the illustrated example, the first adjustment stage 2761 includes rails 2751a that are connected to a device housing (not shown) and a first carriage 2753a that slides on the rails. Other components may be included per the description of the first adjuster portion 112 or the first adjuster portions described in FIGS. 3-26.

The second adjustment stage 2762 is a vertical adjustment stage that allows the optical module 2726 to move vertically. In the illustrated example, the second adjustment stage 2762 includes rails 2751b that are fixedly connected to the first carriage 2753a, a second carriage 2753b that slides on the rails 2751b, and springs 2752b that bias the second carriage 2753b to a desired initial position relative to the first carriage 2753a. Other components may be included per the description of the first adjuster portion 112 or the first adjuster portions described in FIGS. 3-26.

The third adjustment stage 2763 is an eye-relief adjustment stage that allows the optical module 2726 to move longitudinally (toward and away from the user). In the illustrated example, the third adjustment stage 2763 includes rails 2751c that are fixedly connected to the second carriage 2753b, a third carriage 2753c that slides on the rails 2751c, and springs 2752c that bias the third carriage 2753c to a desired initial position relative to the second carriage 2753b. The optical module 2726 is connected to the third carriage 2753c. Other components may be included per the description of the first adjuster portion 112 or the first adjuster portions described in FIGS. 3-26.

Figure 28:
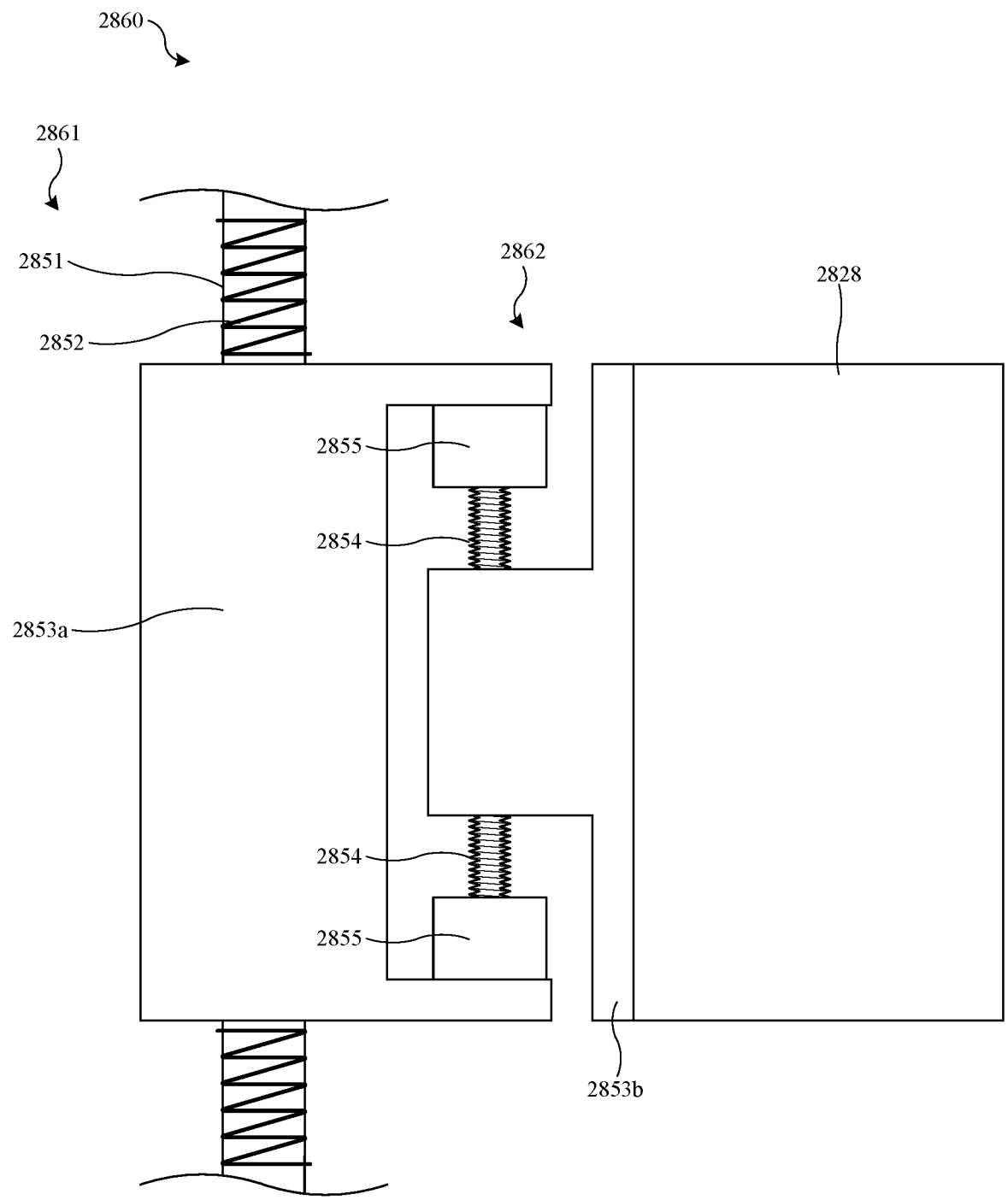
FIG. 28 is a side view illustration that shows an adjustment assembly for fine and gross adjustment.

FIG. 28 is a side view assembly that shows an adjuster assembly 2860 that is configured to adjust the position of an optical module 2826 for IPD adjustment using gross and find adjustment. The adjuster assembly 2860 may be included in any of the head-mounted devices described with respect to FIGS. 1-22, for example as a part of the first device portion of those devices, and used in connection with the left and right optical modules of those devices.

The adjuster assembly 2860 includes a gross adjustment stage 2861 and a fine adjustment stage 2862.

The gross adjustment stage 2861 may be implemented according to the first adjuster portion of any of the implementations shown in FIGS. 1-22 to mechanically adjust the position of the optical module 2826 in response to connection of a second device portion to a first device portion in a two part head-mounted device. In the illustrated example, the gross adjustment stage includes a rail 2851, springs 2852 that position the optical module 2826 on the rail 2851 absent an external force, and a first carriage 2853a that slides on the rail 2851 and is moved by the springs 2852.

The fine adjustment stage 2862 is configured to be controlled independent of the gross adjustment stage 2861 and has a small range of travel. In the illustrated example, the fine adjustment stage 2862 is electronically controlled in that it moves a second carriage 2853b along a lead screw 2854 using electric motors 2855. The lead screw 2854 and electric motors 2855 are connected to the first carriage 2853a and the second carriage 2853b is connected to the optical module 2826.

In some implementations, fine adjustment can be performed using very small actuators in lieu of the electric motors 2855 shown in the illustrated example. In one implementation, piezoelectric actuators are used. In another example, resonant frequency-based actuators are used.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to adjust features of a head-mounted device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores adjustment related information that allows the head-mounted device to be adjusted for a user upon connection of the user-specific second device portion to the first device portion. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to allow adjustment of features of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that data is maintained or entirely prohibit the development of a profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, adjustments may be performed using purely mechanical means or using information that is stored only on the device (e.g., on the second device portion).

What is claimed is:

1. A head-mounted device, comprising:
    a first device portion that includes:
        a primary housing,
        a first optical module,
        a second optical module,
        a first coupler portion that is connected to the primary housing, and
        a first adjuster portion that is operable to move the first optical module and the second optical module with respect to the primary housing, the first adjuster portion including a first contact surface; and
    a second device portion that includes:
        a secondary housing,
        a face cushion that is connected to the secondary housing,
        a second coupler portion that is connected to the secondary housing, and
        a second adjuster portion that is operable to move the first optical module and the second optical module with respect to the primary housing, the second adjuster portion including a second contact surface,
    wherein the first coupler portion of the first device portion is connectable to the second coupler portion of the second device portion to define a connected position in which the first device portion is connected to the second device portion and a disconnected position in which the first device portion is disconnected from the second device portion, and
    wherein movement of the first device portion and the second device portion from the disconnected position to the connected position causes the second contact surface to engage the first contact surface to transfer a force from the second contact surface to the first contact surface to cause movement of the first adjuster portion and a corresponding movement of the first optical module and the second optical module.

2. The head-mounted device of claim 1, wherein the contact surfaces of the second adjuster portion are located laterally outward relative to the first optical module and the second optical module.

3. The head-mounted device of claim 1, wherein the contact surfaces of the second adjuster portion are located laterally inward relative to the first optical module and the second optical module.

4. The head-mounted device of claim 1, wherein the second adjuster portion includes a wedge that engages the first adjuster portion to cause the first adjuster portion to move the first optical module and the second optical module in response to movement of the first device portion and the second device portion from the disconnected position to the connected position.

5. The head-mounted device of claim 1, wherein the second adjuster portion includes annular contact surfaces that engage the first optical module and the second optical module to cause the first adjuster portion to move the first optical module and the second optical module in response to movement of the first device portion and the second device portion from the disconnected position to the connected position.

6. The head-mounted device of claim 1, wherein the first adjuster portion includes a rail, wherein the first optical module and the second optical module are slidably mounted on the rail.

7. The head-mounted device of claim 1, wherein the first adjuster portion includes springs that define an initial position for the first optical module and the second optical module in the disconnected position.

8. The head-mounted device of claim 1, wherein the first adjuster portion includes cams that cause movement of the first optical module and the second optical module in response to movement of the first device portion and the second device portion from the disconnected position to the connected position.

9. The head-mounted device of claim 1, wherein the second adjuster portion includes stop surfaces that allow the first optical module and the second optical module to move to an adjusted position in response to movement of the first device portion and the second device portion from the disconnected position to the connected position.

10. The head-mounted device of claim 1, wherein the first adjuster portion includes a first group of magnetic connector components, the second adjuster portion includes a second group of magnetic connector components, and magnetic attraction of the first group of magnetic connector components to the second group of magnetic connector components causes the first adjuster portion to move the first optical module and the second optical module in response to movement of the first device portion and the second device portion from the disconnected position to the connected position.

11. The head-mounted device of claim 1, wherein the first optical module and the second optical module are connected to the primary housing by an elastic support structure.

12. The head-mounted device of claim 1, wherein the first adjuster portion includes pneumatic actuators.

13. The head-mounted device of claim 1, wherein the first adjuster portion allows manual adjustment of the first optical module and the second optical module, and the second adjuster portion includes stop surfaces.

14. The head-mounted device of claim 1, wherein the first adjuster portion includes flexible connectors that are operable to move the first optical module and the second optical module, the flexible connectors are tensioned when the head-mounted device is worn by a user, and second adjuster portion includes stop surfaces.

15. The head-mounted device of claim 1, wherein the first adjuster portion includes a gross adjustment stage and a fine adjustment stage.

16. A head-mounted device, comprising:
a first device portion that includes:
a primary housing,
a first optical module,
a second optical module,
a first adjuster portion that is operable to move the first optical module and the second optical module with respect to the primary housing; and
a second device portion that includes:
a secondary housing,
a second adjuster portion that is operable to move the first optical module and the second optical module with respect to the primary housing,
wherein the first device portion is connectable to the second device portion to define a connected position and a disconnected position, and
wherein the second adjuster portion includes a wedge that engages the first adjuster portion to cause the first adjuster portion to move the first optical module and the second optical module in response to movement of the first device portion and the second device portion from the disconnected position to the connected position.

17. The head-mounted device of claim 16, wherein the wedge includes contact surfaces that engage contact surfaces of the first adjuster portion to cause the first adjuster portion to move the first optical module and the second optical module.

18. A head-mounted device, comprising:
a first device portion that includes:
a first optical module,
a second optical module,
a first adjuster portion that is operable to move the first optical module and the second optical module; and
a second device portion that includes:
a second adjuster portion that is operable to move the first optical module and the second optical module,
wherein the first device portion is connectable to the second device portion to define a connected position and a disconnected position, and
wherein the second adjuster portion includes stop surfaces configured to engage the first optical module and the second optical module to cease movement of the first optical module and the second optical module at an adjusted position in response to movement of the first device portion and the second device portion from the disconnected position to the connected position, wherein positions of the stop surfaces on the second adjuster portion are adjustable to change the adjusted position.

19. The head-mounted device of claim 17, wherein the contact surfaces of the wedge are located laterally outward relative to the first optical module and the second optical module.

20. The head-mounted device of claim 17, wherein the contact surfaces of the wedge are located laterally inward relative to the first optical module and the second optical module.

21. The head-mounted device of claim 17, wherein the second adjuster portion includes stop surfaces that allow the first optical module and the second optical module to move to an adjusted position in response to movement of the first device portion and the second device portion from the disconnected position to the connected position.

22. The head-mounted device of claim 18, wherein the second adjuster portion includes contact surfaces that engage contact surfaces of the first adjuster portion to cause the first adjuster portion to move the first optical module and the second optical module in response to movement of the first device portion and the second device portion from the disconnected position to the connected position.

23. The head-mounted device of claim 22, wherein the contact surfaces of the second adjuster portion are located laterally outward relative to the first optical module and the second optical module.

24. The head-mounted device of claim 22, wherein the contact surfaces of the second adjuster portion are located laterally inward relative to the first optical module and the second optical module.

25. The head-mounted device of claim 18, wherein the second adjuster portion includes a wedge that engages the first adjuster portion to cause the first adjuster portion to move the first optical module and the second optical module in response to movement of the first device portion and the second device portion from the disconnected position to the connected position.

* * * * *